(12) United States Patent
Yoo et al.

(10) Patent No.: US 11,123,696 B2
(45) Date of Patent: Sep. 21, 2021

(54) MICROBUBBLE INTEGRATED STRUCTURE AND METHOD OF MANUFACTURING THE SAME

(71) Applicant: Research & Business Foundation SUNGKYUNKWAN UNIVERSITY, Suwon-si (KR)

(72) Inventors: Pil Jin Yoo, Seoul (KR); Seon Ju Yeo, Gyeongsan-si (KR); Min Jun Oh, Suwon-si (KR)

(73) Assignee: RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 317 days.

(21) Appl. No.: 16/274,741

(22) Filed: Feb. 13, 2019

(65) Prior Publication Data
US 2019/0247808 A1  Aug. 15, 2019

(30) Foreign Application Priority Data
Feb. 13, 2018  (KR) .......................... 10-2018-0017807

(51) Int. Cl.
*B01F 3/04*  (2006.01)
*C01B 32/198*  (2017.01)

(52) U.S. Cl.
CPC ...... *B01F 3/04262* (2013.01); *B01F 3/04439* (2013.01); *C01B 32/198* (2017.08); *B01F 3/04985* (2013.01); *B01F 2003/04312* (2013.01); *B01F 2003/04858* (2013.01); *B01F 2003/04943* (2013.01); *B01F 2215/0036* (2013.01); *C01P 2004/41* (2013.01)

(58) Field of Classification Search
CPC .............. B01F 3/04262; B01F 3/04439; B01F 3/04985; B01F 2003/04312; B01F 2003/04858; B01F 2003/04943; B01F 2215/0036; C01B 32/198; C01P 2004/41
USPC .................................... 261/76, 104, DIG. 75
See application file for complete search history.

(56) References Cited

U.S. PATENT DOCUMENTS

| | | | |
|---|---|---|---|
| 9,434,620 B2 * | 9/2016 | Kim ....................... | B82Y 30/00 |
| 10,449,497 B2 * | 10/2019 | Biegelsen ............. | C01B 32/198 |
| 10,493,426 B2 * | 12/2019 | Zhang ....................... | B01J 20/06 |
| 2013/0314844 A1 * | 11/2013 | Chen ....................... | H01G 11/28 |
| | | | 361/502 |
| 2020/0086277 A1 * | 3/2020 | Wang ..................... | C01G 39/02 |
| 2020/0392326 A1 * | 12/2020 | Chen ..................... | C01B 32/198 |

FOREIGN PATENT DOCUMENTS

KR  10-2018-0019451 A   2/2018

OTHER PUBLICATIONS

A. P. Roberts et al. "Elastic Moduli of Model Random Three-Dimensional Closed-Cell Cellular Solids", Acta mater. 49 (2001) 189-197.
Cheng Zhu et al. "Highly compressible 3D periodic graphene aerogel microlattices", Nature Communications, published Apr. 22, 2015, (8 pp).

(Continued)

*Primary Examiner* — Charles S Bushey
(74) *Attorney, Agent, or Firm* — Cantor Colburn LLP

(57) ABSTRACT

The present invention relates to a method of manufacturing an integrated structure using microbubbles, and an integrated structure manufactured by the method.

18 Claims, 17 Drawing Sheets

(56) References Cited

OTHER PUBLICATIONS

Esther Garcla-Tunon et al. "Printing in Three Dimensions with Graphene", Adv. Mater. 2015, 27, 1688-1693.
Faisal Shahzad et al. "Electromagnetic interference shielding with 2D transition metal carbides (MXenes)", Science, 2016, vol. 353, Issue 6304 (5 pp).
Gregorio de la Osa et al. "Printing of Graphene Nanoplatelets into Highly Electrically Conductive Three-Dimensional Porous Macrostructures", Chem. Mater 2016, 28, 6321-6328.
Haiyan Sun et al. "Multifunctional, Ultra-Flyweight, Synergistically Assembled Carbon Aerogels", Adv. Mater. 2013, 25, 2554-2560.
Hao Sun et al. "Novel Graphene/Carbon Nanotube Composite Fibers for Efficient Wire-Shaped Miniature Energy Devices", Adv. Mater. 2014, 26, 2868-2873.
Huigang Zhang et al. "Three-dimensional bicontinuous ultrafast-charge and -discharge bulk battery electrodes", Nature Nanotechnology, vol. 6, May 2011 (5 pp).
Ji Liu et al. "Hydrophobic, Flexible, and Lightweight MXene Foams for High-Performance Electromagnetic-Interference Shielding", Adv Mater 2017, 29, 1702367.
Jianhua Ma et al. "Highly conductive, mechanically strong graphene monolith assembled by three-dimensional printing of large graphene oxide", Journal of Colloid and Interface Science 534 (2019) 12-19.
Kyu Hun Kim et al. "Graphene coating makes carbon nanotube aerogels superelastic and resistant to fatigue", Nature Nanotechnology, vol. 7, Sep. 2012 (5 pp).
Ling Qiu et al. "Biomimetic superelastic graphene-based cellular monoliths", Nature Communications, 2012, published Aug. 23, 2012, (7 pp).
Lucas R. Meza et al. "Strong, lightweight, and recoverable three-dimensional ceramic nanolattices", Science 345, 1322 (2014), (6 pp).
M.G. Rashed et al. "Metallic microlattice materials: A current state of the art on manufacturing, mechanical properties and applications", Materials and Design 95 (2016) 518-533.
Marcus A. Worsley et al. "Mechanically robust and electrically conductive carbon nanotube foams", Appl. Phys. Lett. 94, 073115 (2009), (4 pp).
Matthias Mecklenburg et al. "Aerographite: Ultra Lightweight, Glexible Nanowall, Carbon Microtube Material with Outstanding Mechanical Performance", Adv. Mater. 2012, 24, 3486-3490.
Min Kyoon Shin et al. "Synergistic toughening of composite fibres by self-alignment of reduced graphene oxide and carbon nanotubes", Nature Communications, published Jan. 31, 2012, (8 pp).
Na Ni et al. "Understanding Mechanical Response of Elastomeric Graphene Networks", Scientific Reports, Sep. 8, 2015, (14 pp).
Qiangqiang Zhang et al. "3D Printing of Graphene Aerogels", Small 2016, 12(13), 1702-1708.
Seon Ju Yeo et al. "A Plesiohedral Cellular Network of Graphene Bubbles for Ultralight, Strong, and Superelastic Materials", Adv. Mater. 2018, 30, 1802997.
Suelen Barg et al. "Mesoscale assembly of chemically modified graphene into complex cellular networks", Nature Communications, 2014, published Jul. 7, 2014, (10 pp).
T.A. Schaedler et al. "Ultralight Metallic Microlattices", Science 334, 962 (2011), (5 pp).
J. Sassi et al. "Graphene-based mid-infrared room-temperature pyroelectric bolometers with ultrahigh temperature coefficient of resistance", Nature Communications, 2016, published Jan. 31, 2017, (10 pp).
Xiaoli Zhao et al. "Wet-Spun Superelastic Graphene Aerogel Millispheres with Group Effect", Adv. Mater. 2017, 29, 1701482.
Xiaoyu Zheng et al. "Ultralight, ultrastiff mechanical metamaterials", Science 344, 1373 (2014), (6 pp).
Xuetong Zhang et al. "Mechanically strong and highly conductive graphene aerogel and its use as electrodes for electrochemical power sources", J. Mater. Chem., 2011, 21, 6494.
Yang Si et al. "Ultralight nanofibre-assembled cellular aerogels with superelasticity and multifunctionality", Nature Communications, 2014, published Dec. 16, 2014, (9 pp).
Yang Zhao et al. "A Versatile, Ultralight, Nitrogen-Doped Graphene Framework", Angew. Chem. Int. Ed. 2012, 51, 11371-11375.
Yingpeng Wu et al. "Three-dimensionally bonded spongy graphene material with super compressive elasticity and near-zero Poisson's ratio", Nature Communications, published Jan. 20, 2015, (9 pp).
Yingru Li et al. "Highly Compressible Macroporous Graphene Monoliths via an Improved Hydrothermal Process", Adv. Mater. 2014, 26, 4789-4793.
Yuxi Xu et al. "Self-Assembled Graphene Hydrogel via a One-Step Hydrothermal Process", ACS NANO, 2010, vol. 4, No. 7, (7 pp).
Yuyang Qin et al. "Lightweight, Superelastic, and Mechanically Flexible Graphene/Polyimide Nanocomposite Foam for Strain Sensor Application", ACS NANO, 2015, 2015, vol. 9, No. 9, 8933-8941.
Zhao Qin et al. "The mechanics and design of a lightweight three-dimensional graphene assembly", Sci. Adv. 2017; 3: e1601536.
Zhiqiang Niu et al. "A Leavening Strategy to Prepare Reduced Graphene Oxide Foams", Adv. Mater. 2012, 24, 4144-4150.

* cited by examiner

MICROBUBBLE INTEGRATED STRUCTURE AND METHOD OF MANUFACTURING THE SAME

CROSS-REFERENCE TO RELATED APPLICATION

This application claims priority to and the benefit of Korean Patent Application No. 10-2018-0017807 filed in the Korean Intellectual Property Office on Feb. 13, 2018, the entire contents of which are incorporated herein by reference.

BACKGROUND OF THE INVENTION

(a) Field of the Invention

The present invention relates to a microbubble integrated structure and method of manufacturing the same. More specifically, the present invention relates to a method of manufacturing an integrated structure based on "a process in which a gas phase is injected into a liquid phase using a fine single/multichannel or porous multi-channel (membrane) including a microfluidic system," "a process in which bubbles are generated using ultrasonic waves (20 kHz or more)," and "a process of liquid stirring and/or shearing gas to generate bubbles," and an integrated structure manufactured by the method.

(b) Description of the Related Art

Much research has been undertaken on micro-sized microparticles as super capacitors, next-generation electronic and energy storage devices, and catalytic materials. Particularly, a three-dimensional graphene structure is attracting much attention, and a structurally controlled three-dimensional graphene structure may provide ultra-light weight, high surface area, improved electrical conductivity, and enhanced mechanical characteristics. In order to precisely control the three-dimensional graphene structure, a hydrothermal method, a freeze-drying method, a sol-gel reaction method, and the like are used. However, even if this method is used, there are limits for controlling sizes and shapes of the three-dimensional graphene structure.

In order to overcome the limitations of the above methods, a method of making a three-dimensional graphene structure using a droplet or a bubble, which is a multi-phase fluid mixture, has been attempted. Generally, a graphene-based microbubble having a three-dimensional structure may be produced by dispersing a gas in a solution including graphene and a surfactant by a method such as ultrasonic decomposition, stirring, or high-speed shear mixing. However, in this method, a mostly spherical microbubble is produced due to minimized surface energy, and it is difficult to control so that it may have a uniform distribution size. At this time, the microbubble as described above exists in the form of bubbles with respect to a solvent. However, when the solvent is removed, a shell partition wall forming a space for accommodating gas is easily collapsed and structural stability is low. Therefore, there are limits for application to an electronic material.

In addition, there is a method of manufacturing a hollow particle by using a sacrificial template, but this method takes a long time to manufacture, has low productivity, and is difficult to manufacture a three-dimensional structure having various sizes and shapes.

On the other hand, recently, non-spherical droplets or bubbles have attracted attention because they exhibit different characteristics from spherical three-dimensional structures in terms of filling characteristics, optical characteristics, electrical characteristics, and encapsulation efficiency. However, it is not easy to manufacture a non-spherical bubble by a simple method.

SUMMARY OF THE INVENTION

It is an object of the present invention to provide a method of manufacturing a two-dimensional or three-dimensional integrated structure using a microbubble capable of controlling sizes and shapes of the microbubble and having a very stable structure.

Another object of the present invention is to provide an integrated structure which is formed of a lightweight and rigid structure manufactured using microbubbles and may be utilized as an ultra-lightweight, high-stiffness material.

A method of manufacturing an integrated structure for an object of the present invention includes: a first step of forming microbubbles; a second step of inducing self-assembly of the microbubbles by buoyancy to form a structure under a condition of a height difference of a liquid level; and a third step of drying the structure.

In an embodiment, the method may further include a fourth step of performing a reduction process after the third step.

A method of manufacturing an integrated structure for another object of the present invention includes: a first step of forming microbubbles; a second step of processing micro-mesh having gaps that are smaller than diameters of the microbubbles into a three-dimensional frame; and a third step of laminating the microbubbles inside the three-dimensional frame by filtering the microbubbles into the three-dimensional frame.

In an embodiment, the method may further include a fourth step of performing a reduction process after the third step.

The first step may be a step of forming the microbubbles through a process in which a gas phase is injected into a liquid phase using a fine single/multichannel or porous multi-channel (membrane) including a microfluidic system.

An integrated structure for another purpose of the present invention is a structure which is manufactured by the method for manufacturing an integrated structure of the present invention, is formed into a two-dimensional or three-dimensional structure, and exhibits light weight, ultra-high integration, and high stiffness characteristics.

According to the method for manufacturing an integrated structure using microbubbles manufactured on the basis of a process in which a gas phase is injected into a liquid phase using a fine single/multichannel or porous multi-channel (membrane) including a microfluidic system of the present invention, a flow rate, the reduction process, and the like may be adjusted to control density, structural rigidity, etc. of the integrated structure. Therefore, an integrated structure having light weight, high stiffness, and high elasticity may be manufactured.

DETAILED DESCRIPTION OF THE EMBODIMENTS

The terminology used herein is for the purpose of describing particular embodiments only and is not intended to be limiting of the invention. The singular forms may include plural forms unless the context clearly dictates otherwise. In this application, the terms "comprises," "having", etc. are intended to specify the presence of stated features, steps, acts, elements, parts, or combinations thereof. However, the terms may not exclude the presence or addition of one or more other features, steps, acts, components, parts, or combinations thereof.

Unless defined otherwise, all terms used herein, including technical or scientific terms, have the same meaning as commonly understood by one of ordinary skill in the art to which this invention belongs. Terms such as those defined in commonly used dictionaries are to be interpreted as having meanings that are consistent with the meanings of the context in the relevant art, and are not to be construed in an idealized or overly formal sense unless expressly defined in the present application.

A method of manufacturing an integrated structure according to the present invention includes: a first step of forming microbubbles; a second step of inducing self-assembly of the microbubbles by buoyancy to form a structure under a condition of a height difference of a liquid level; and a third step of drying the structure.

In an embodiment, the method may further include a fourth step of performing a reduction process or a heat treatment process at 70° C. or higher after the third step.

A method of manufacturing another integrated structure according to the present invention includes: a first step of forming microbubbles; a second step of processing micro-mesh having gaps that are smaller than diameters of the microbubbles into a three-dimensional frame; and a third step of laminating the microbubbles inside the three-dimensional frame by filtering the microbubbles into the three-dimensional frame.

In an embodiment, the method may further include a fourth step of performing a reduction process or a heat treatment process at 70° C. or higher after the third step.

For example, the first step may be a step of forming a microbubble through a process in which a gas phase is injected into a liquid phase using a fine single/multichannel or porous multi-channel (membrane) including a microfluidic system, but is not limited thereto. That is, although the present invention has been described on the basis that the microbubbles are formed using a microfluidic system, the step of forming the microbubble is not necessarily limited thereto.

Figure 16:
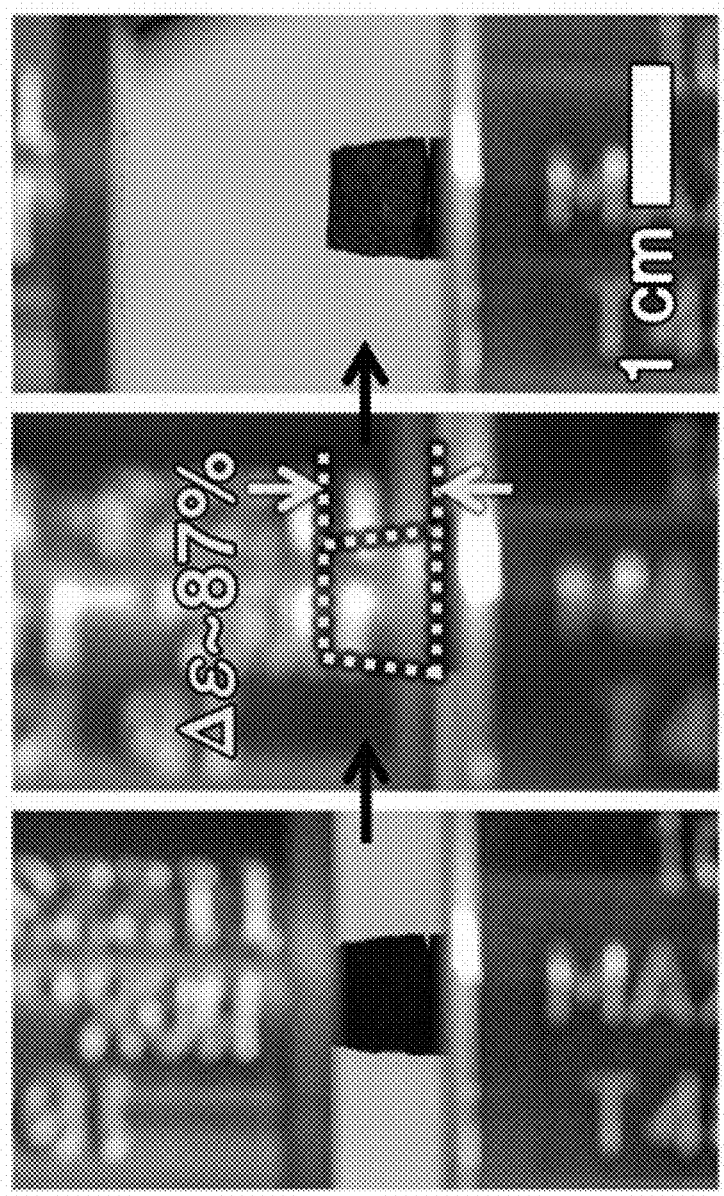
Figure 17:
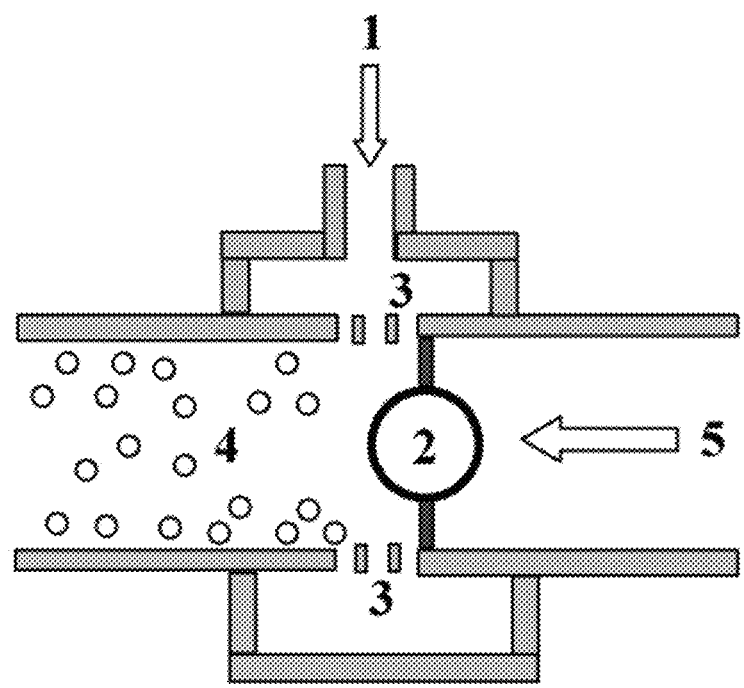
FIG. 17 is a view showing an example of forming microbubbles using a microfluidic system.

For example, the step of forming the microbubbles using the fine single/multichannel or porous multi-channel (membrane) including the microfluidic system may be a step using a flowing tube including a spherical body as shown FIG. 17. Referring to FIG. 17, there is a pipeline including a spherical body 2, and a flow velocity of a liquid 5 flowing along the pipeline is increased by the spherical body. Herein, a gas 1 is injected into the liquid 5 having an increased flow velocity through a small hole 3, and thus the gas phase may be injected into the liquid phase to form a microbubble 4. In FIG. 16, an orifice may be used instead of the spherical body. In addition, the microbubble may be formed by injecting gas into a rotary liquid flow or the microbubble may be formed by using a venturi tube (venturi) or an ejector. In addition, the microbubble may be formed using a porous multi-channel (membrane), for example a Shirasu porous glass (SPG) membrane which is not a microfluidic system. Further, each microbubble constituting the integrated structure according to an embodiment may be formed through various methods.

The integrated structure of the present invention may be a two-dimensional or three-dimensional structure having super-lightweight, super-integrated, and high stiffness characteristics manufactured through the method for manufacturing an integrated structure of the present invention.

Figure 1:
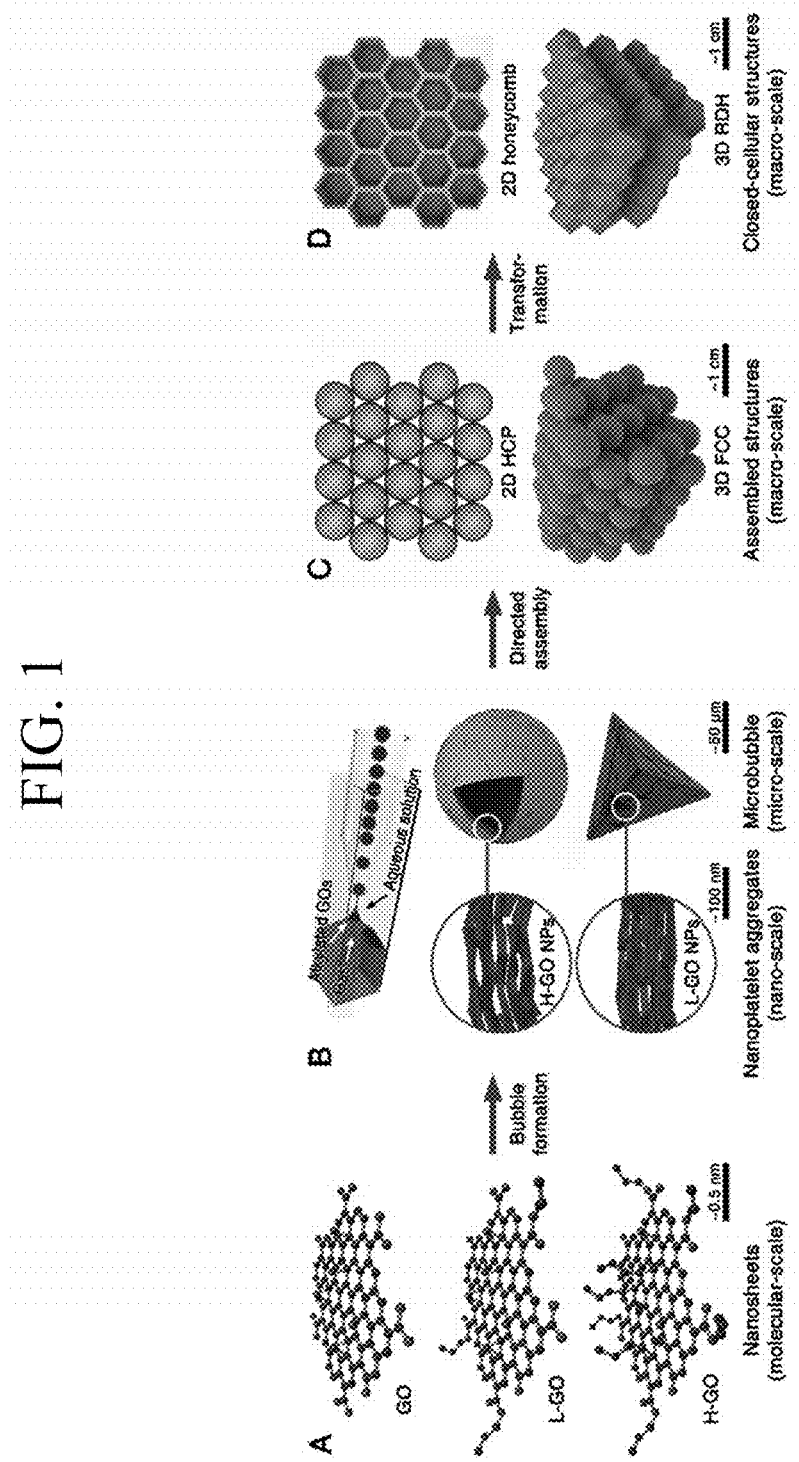
FIG. 1 is a schematic view showing a method of manufacturing an integrated structure according to the present invention.

FIG. 1 is a schematic view showing a method of manufacturing an integrated structure according to the present invention.

In the method for manufacturing an integrated structure according to the present invention, an integrated structure having light weight, high stiffness, and high elasticity characteristics may be manufactured by using microbubbles or solid bubbles manufactured on the basis of gas-in-oil-in-water (G/O/W) as a unit structure.

In an embodiment, the microbubbles may be formed by using an alkylated two-dimensional nanosheet dispersed in an organic solvent as a film-forming material. The nanosheet may be formed of graphene oxide or a metal chalcogenide. Specifically, referring to FIG. 2, the microbubbles have a three-dimensional structure in which a gas is accommodated in a space surrounded by a film formed by alkylated two-dimensional sheets, and exhibit a spherical or non-spherical shape.

Hereinafter, the term 'spherical shape' in the present invention means a three-dimensional stereostructure composed only of a surface having a curvature, and a cross-sectional shape of a complete circle or an ellipse may also be defined as a substantially spherical shape. Also, 'non-spherical' means a multi-faceted stereostructure in which at least one vertex appears.

Hereinafter, with reference to FIGS. 7 and 8 together with FIG. 2, manufacture of a non-spherically shaped microbubble by alkylation and deformation of a two-dimensional sheet is described in more detail.

According to an embodiment, a graphene-based material, a chalcogen compound-based material, or an MXene-based material may be used as the two-dimensional sheet. That is, the microbubbles may be manufactured by alkylating the graphene-based two-dimensional material, the chalcogen compound-based two-dimensional material, or the MXene-based two-dimensional material through a microfluidic system. In addition, the MXene-based two-dimensional material may be used for manufacture of the microbubbles without alkylation.

Figure 7:
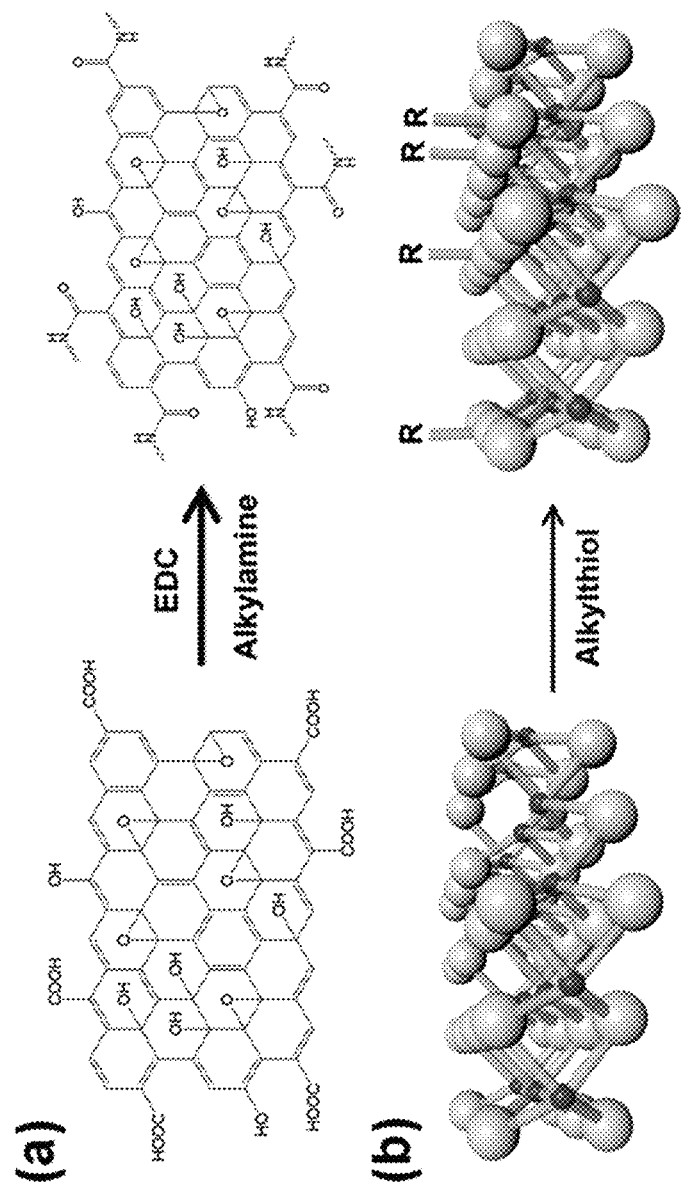
FIG. 7 is a view for explaining alkylation on a two-dimensional sheet in the method of manufacturing solid bubbles according to the present invention.

FIG. 7 is a view for explaining alkylation on a two-dimensional sheet in the method of manufacturing the microbubble.

In FIG. 7, (a) is a schematic view for explaining alkylation of a graphene oxide as a two-dimensional sheet, and (b) is a schematic view for explaining alkylation of $MoS_2$ as a two-dimensional sheet.

Referring to FIG. 7 (a), when the two-dimensional sheet is a graphene oxide, it includes a carboxyl group (—COOH) as a surface functional group. A reaction between the carboxy group of the graphene oxide and the alkylamine may be induced using a material for dispersing the graphene oxide in an alkylation solvent, and an alkylated graphene oxide may be synthesized through an amide bond. That is, COOH of the graphene oxide is alkylated into CO—NHR. Herein, R is a C1 to C30 alkyl group, and may include a branched isomer as well as a linear alkyl group. The material for dispersing the graphene oxide in the alkylation solvent may be 1-ethyl-3-(3-dimethylamino) propyl carbodiimide [EDC], hydrochloride, and the like. On the other hand, when the two-dimensional sheet is a graphene oxide, the final structure of the integrated structure may have further improved flame retardancy.

Referring to FIG. 7 (b), when the two-dimensional sheet is molybdenum sulfide, a thiolation reaction is performed on defects of molybdenum sulfide using an alkyl thiol of R—SH. This thiolation reaction eventually results in the introduction of an alkyl group into the molybdenum sulfide, so that the alkylation reaction of molybdenum sulfide is performed (Adv. Mater., 2015, 27, 6225-6229).

Alternatively, alkylation of molybdenum sulfide may be performed by first introducing a carboxyl group into a surface of molybdenum sulfide, and inducing an alkylamine reaction for the carboxyl group as shown in FIG. 7 (a) to form an amide bond (RSC Adv., 2014, 4, 32570).

On the other hand, the MXene-based material is a compound having water dispersibility, and may be, for example, a titanium compound or a niobium compound. The MXene-based material is easily alkylated (functionalized), is suitable for manufacturing microbubbles according to an embodiment, and is a very promising material for electromagnetic wave shielding and other applications, and an integrated structure which is manufactured using microbubbles manufactured using the method may be applied to a wide variety of fields. As described above, the MXene-based material may enable manufacture of the microbubbles without alkylation (functionalization). In addition, unlike other two-dimensional sheets, the MXene-based material has excellent conductivity, so that it is possible to provide an integrated structure having excellent conductivity when the MXene-based material is used as a two-dimensional sheet. (Even when a graphene-based material is used as a two-dimensional sheet, it may not be stated that an integrated structure has no conductivity since an integrated structure is manufactured through reduction. However, compared with the case of using the MXene-based material as a two-dimensional sheet, conductivity of the integrated structure manufactured from the graphene-based material is greatly reduced.)

For example, the MXene-based material may be represented by Chemical Formula 1, but is not limited thereto.

$$M_{n+1}AX_n \qquad \text{Chemical Formula 1}$$

In Chemical Formula 1,

M is an early transition metal,

A is a Group IIIA element, a Group IVA element, a Group VA element, a Group VIA element, and/or Cd, X is carbon and/or nitrogen, and n is an integer ranging from 1 to 3.

For example, M may be Sc, Ti, V, Cr, Zr, Nb, Mo, Hf, Ta, or a combination thereof, A may be Al, Si, P, S, Ga, Ge, As, Cd, In, Sn, Ti, Pb, or a combination thereof, and X is carbon, nitrogen, or a combination thereof.

The MXene-based material represented by Chemical Formula 1 has a structure composed of an M layer, an A layer, and an X layer, and various combinations may be possible depending on the number of elements.

For example, the MXene-based material represented by Chemical Formula 1 may include $Ti_2AlC$, $Nb_2AlC$, $Ti_3AlC_2$, $Ti_3SiC_2$, $Ti_2AlC$, $Ti_2AlN$, and the like, but is not limited thereto.

For example, the MXene-based material may include $Ti_3C_2$, $Ti_2C$, $Nb_2C$, $V_2C$, $V_3C_2$, $Cr_3C_2$, $Ti_3CN$, or $Ta_4C_3$.

On the other hand, in the manufacture of the microbubbles, the two-dimensional sheet (two-dimensional material) may be used with carbon nanotubes (CNTs). In this case, mechanical properties (or elasticity) of the finally manufactured integrated structure may be further improved.

The alkylation solvent in which the alkylation reaction as described in FIGS. 7 (a) and 7 (b) is performed may include at least one of water and an alcohol, and a degree of the alkylation may be controlled depending on shapes of the microbubbles to be manufactured to determine the alkylation reaction conditions. With these characteristics, if an alkylated two-dimensional sheet is applied to a microfluidic system, a composite bubble of the G/O/W system may be easily formed.

Figure 8:
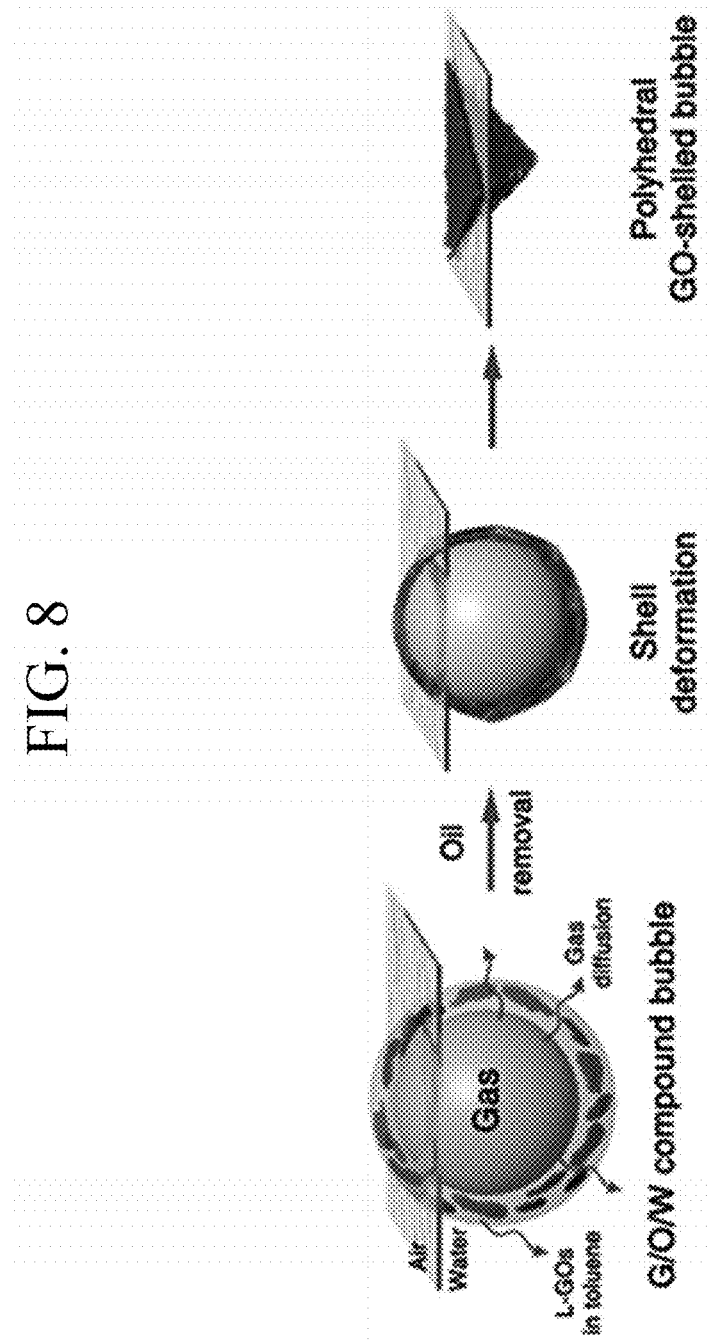
FIG. 8 is a view for explaining a deformation phenomenon in the method of manufacturing solid bubbles according to the present invention.

FIG. 8 is a view for explaining a deformation phenomenon in the method of manufacturing solid bubbles according to the present invention.

Figure 2:
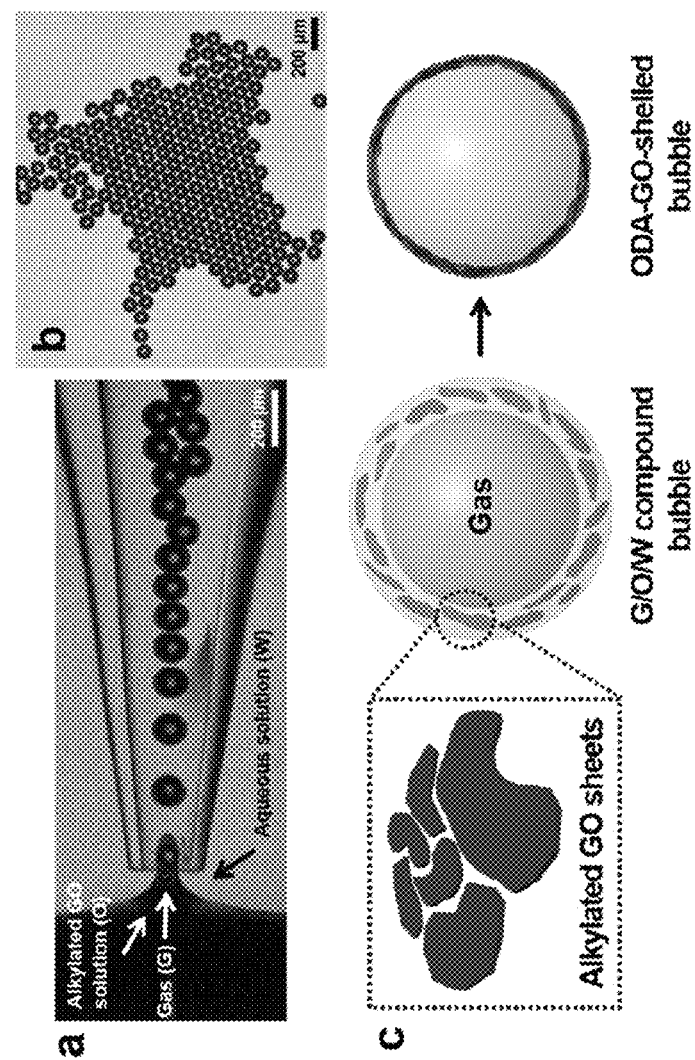
FIGS. 2 to 5 are each views showing analysis results of the microbubbles and the integrated structure of the present invention.

Referring to FIG. 8 together with FIG. 2, when the hydrophobic solvent is removed from the composite bubble of the G/O/W system, deformation occurs, and as a result, microbubbles having a non-spherically shaped three-dimensional structure may be formed.

Structural stability of the microbubbles is determined by dissolution of the gas in the space in accordance with a Laplace pressure difference between the inside and outside, that is, the dissolution of the gas depends on the alkylated two-dimensional sheet included in a film. In the case of a two-dimensional sheet having a low degree of alkylation, dispersion stability in the hydrophobic solvent is insufficient as compared with the case where the degree of alkylation is high, and the two-dimensional sheet is present in an aggregated form. This causes changes of characteristics such that the two-dimensional sheets are assembled inside the shell, and changes of interfacial tension, resulting in a Laplace pressure difference. As a result, deformation of the film occurs and the spherical shape is deformed into a polyhedron shape. That is, since a thickness distribution of the two-dimensional sheet having a high degree of alkylation becomes uniform, a thickness of a liquid-phase film is also uniform, and a drying process is performed so that the deformation phenomenon occurs almost negligibly even if the hydrophobic solvent is removed.

On the other hand, as shown in FIG. 8, when the degree of alkylation is low, differences in the thickness distribution and elastic modulus between the two-dimensional sheets is large. Therefore, the deformation phenomenon occurs at relatively thin and weak portions of the liquid-phase film having a non-uniform thickness of the composite bubble of the G/O/W system produced in the microfluidic system, and thus non-spherical microbubbles may be formed.

In an embodiment, diameters of the microbubbles and thicknesses of the nanosheets may be controlled by a flow rate ratio of the microfluidic system, thereby a microbubble structure (integrated structure) having different structural characteristics may be manufactured by inducing a change in physical properties and density of the microbubble unit. In other words, the diameters of the microbubbles and the thicknesses of the films may be controlled according to the flow rate condition of the microfluidic system, and the density and structural stiffness of the integrated structure may be controlled and diversified.

In an embodiment, the integrated structure may be a two-dimensional structure or three-dimensional structure.

In an embodiment, when the graphene oxide nanosheet is used as the nanosheet, properties of the nanosheet may be increased by recovering defects of the nanosheet, density thereof may be decreased by removing constituent materials having a low molecular weight, and structural stiffness may be improved by decreasing voids of the integrated structure when it is introduced into thermal reduction process.

In an embodiment, the two-dimensional integrated structure may be formed by a hexagonal system self-assembly at a water surface having a Langmuir-Blodgett trough or a convex curved surface because the microbubbles are lighter than water.

In an embodiment, the three-dimensional integrated structure may be formed by processing micromesh having gaps that are smaller than diameters of the microbubbles into a three-dimensional frame, filtering the microbubbles using the frame, and inducing a reverse direction arrangement using buoyancy.

In an embodiment, the density and physical hardness of the structure may be adjusted by controlling diameters, film thicknesses, etc. of the microbubbles forming the two-dimensional or three-dimensional integrated structure.

In an embodiment, a void of the integrated structure may be controlled by heat treatment, and the two-dimensional integrated structure may have a hexagonal system structure, for example, a honeycomb-shaped closed cell super-integrated structure. In the case of the three-dimensional integrated structure, it may be formed as a cubic structure, for example, a closed-cell super-integrated structure having a rhombic dodecahedral honeycomb (RDH) as the unit cell structure.

The microbubbles may be solid microbubbles, and the microbubbles have a ratio of a diameter relative to a thickness of the shell of 1:1000 to 1000:1 and are very light in structure, and may be formed into a tightly closed cell structure. In addition, a continuous closed cell structure between the microbubbles may be formed during the thermal reduction process. Therefore, the integrated structure of the present invention may exhibit ultra-light and high-stiffness characteristics, and thus may be utilized in various fields.

When the integrated structure is introduced into additional thermal reduction in an embodiment, defects of the constituent materials may be recovered by reduction treatment. For example, sp3 bonds of graphene oxide (GO) may be recovered to stable sp2 bonds. In addition, it may remove constituent materials having a low molecular weight, which are unnecessary to maintain the structure, so it may decrease a density and provide a continuous structure without voids between the microbubbles to exhibit very high structural stiffness. Through the thermal reduction, the integrated structure having a two-dimensional hexagonal system may be formed in an integrated structure having a honeycomb structure in an embodiment, and the integrated structure having a three-dimensional cubic structure may be formed as a continuous integrated structure having a rhombic dodecahedral honeycomb structure.

The two-dimensional integrated structure according to an embodiment may be formed as a very uniform structure. For example, when the two-dimensional integrated structure is formed as a hexagonal system structure, it may exhibit a very uniform structure having polydispersity of about 2%; on the other hand, when is formed as a honeycomb structure, it may exhibit a uniform and stable structure having polydispersity of about 6.7%.

In an embodiment, the three-dimensional integrated structure may exhibit an ultra-light level density of about 10 mg/cm$^3$ and may exhibit a Young's modulus of about 600 kPa, which is very high in density.

The two-dimensional integrated structure may be manufactured through the present invention.

According to an embodiment, a height difference of a water surface, which is an environment of a coexisting region where the water level is high and a region where the water level is low, may be created. As the microbubble has a low density, buoyancy is formed in the uppermost side of the liquid surface. Thereby, a Langmuir-Blodgett trough corresponding to the condition or a droplet on a hydrophobic substrate capable of forming a convex liquid surface may easily form a two-dimensional integrated structure.

Microbubbles existing on the water surface on the Langmuir-Blodgett trough may form a two-dimensional integrated structure by moving a barrier to maintain a predetermined interfacial pressure and simultaneously lifting a substrate to be coated from the lower side of the water surface to the upper side thereof. Alternatively, the substrate may approach the two-dimensionally assembled microbubbles in parallel to the water surface to form a bubble assembled structure by a Langmuir Schaefer delivering method. A structure may be manufactured by delivering microbubbles formed by a microfluidic system under the condition of an existing height difference of liquid levels and then inducing self-assembly by buoyancy. Crystallinity of the two-dimensional integrated structure may be increased by applying vibrations to the liquid surface where microbubbles are assembled, from the outside.

After arranging the microbubbles in a two-dimensional hexagonal system, the liquid phase is dried, so that the microbubbles on the substrate may have a two-dimensional hexagonal system structure. In other words, the two-dimensional hexagonal structure may be an integrated structure of the microbubbles. At this time, the microbubbles may have the same size or may be different sizes from each other.

As the substrate is hydrophobic, the height difference of the water surface is easily induced, so that a two-dimensional structure having high crystallinity may be obtained.

The three-dimensional integrated structure may be manufactured through the present invention.

In an embodiment, so as to obtain a three-dimensional integrated structure, micro metal mesh having gaps that are smaller than diameters of the microbubble micro metal may be processed into as a frame having the three-dimensional shape to be obtained. For example, for bubbles having a diameter of about 100 microns, mesh having gaps of about 45 microns may be used.

Microbubbles may be filtered through the processed three-dimensional shaped frame, and a sufficient amount of bubbles may be filled and assembled in the frame. In order to increase a three-dimensional arrangement degree, the frame including microbubbles is turned over, and then water may be slowly filtered from the bottom of the frame (lower side) in an opened upper side direction. At this time, the microbubbles may rise by buoyancy above the water, so a three-dimensional cubic structure having a high arrangement degree may be formed in the frame. The formed structure may be washed with a sufficient amount of distilled water and then dried in a desiccator to remove moisture. In other words, the three-dimensional cubic structure may be an integrated structure of the microbubbles. At this time, the microbubbles may have the same size or different sizes from each other.

In the case of microbubbles according to an embodiment using graphene oxide, defects of the unit body for the microbubbles may be recovered by introducing a reduction process such as chemical reduction or thermal reduction. The chemical reduction may be performed using hydrazine vapor (reducing agent) at about 70° C. to about 150° C., for example, about 100° C., for about 1 hour to about 24 hours, for example, about 12 hours. The thermal reduction may be performed using a mixture (hydrogen:argon=1:3 (v/v)) at a ratio of argon based on hydrogen (volume ratio or capacity ratio) of about 1 time to about 5 times, for example, about 3 times, at higher than or equal to about 70° C., for example, about 300° C. to about 1000° C., or about 700° C. to about 800° C., for about 30 minutes to about 2 hours, for example, about 1 hour. By the processes, materials having a low molecular weight may be removed (e.g., inducing additional density loss by removing an unnecessary alkyl chain) and the defects of the microbubble unit body may be repaired; and also by heating the integrated structure, (when the heat treatment process is performed at a temperature of higher than or equal to about 70° C., the inner voids in the integrated structure may be decreased) voids in the integrated structure may be decreased to provide a closed cell structure. Thus, by the reduction process, the two-dimensional hexagonal system arrangement structure may be formed in a super-integrated structure (closed cell structure) having a honeycomb structure, and the three-dimensional cubic arrangement structure may be formed in a super-integrated structure (closed cell structure) having a rhombic dodecahedral honeycomb structure. In a case of the closed cell structure, the continuous structure may be formed compared to the individual cell structure to induce easy dispersion of stress, which is known as a structure having excellent stiffness compared to the competitive open cell structure. In addition, the closed cell structure having discontinuous inner hollows may be effective for being employed as a structural material for insulation and sound absorption.

The present invention relates to a two-dimensional or three-dimensional structure using microbubbles. The microbubbles (hollow particles) may be a structure having a spherical shape or a non-spherical shape, and may have the same size or different sizes from each other. Using the microbubbles of the structure having the spherical shape or non-spherical shape, the two-dimensional or three-dimensional ultra-light weight, highly stiff integrated structure may be obtained. The hexagonal structure of the two-dimensional integrated structure may be formed in a closed structure of, for example, a honeycomb structure, and the cubic structure of the three-dimensional integrated structure may be formed in, for example, a closed cell structure of, for example, a rhombic dodecahedral honeycomb structure.

Gas accommodated in the microbubbles may be an inert gas such as nitrogen ($N_2$) in an embodiment. The accommodated gas may be a gas used during the process of manufacturing the microbubbles.

The film of microbubbles may make a space corresponding to the inside of the microbubbles as a space separated from the outside by connecting the alkylated two-dimensional sheets in a network. A thickness of the film may be about 10 nm to about 200 nm. A part of the gas accommodated in the microbubbles may be diffused between the alkylated two-dimensional sheets and escape to the outside, and when a part of the gas is diffused and escapes to the outside, a shape of the microbubbles may be changed to a non-spherical shape.

The alkylated two-dimensional sheet forming the film may be one in which a surface functional group of a metal chalcogenide or graphene oxide is substituted with an alkyl group. The metal chalcogenide may include molybdenum (Mo) or tungsten (W) as a metal and sulfur (S) or selenium (Se) as a chalcogen, and for example, may be molybdenum sulfide ($MoS_2$).

According to a degree of alkylation of the alkylated two-dimensional sheet for forming the film, a shape of the microbubbles may be controlled to either a spherical or non-spherical shape. Thereby, it may easily provide a spherical shape by using the two-dimensional sheet having a high degree of alkylation. On the contrary, in a case of using a two-dimensional sheet having a low degree of alkylation, a non-spherical shape is more frequently formed than the spherical shape.

The alkylated two-dimensional sheet may be formed through the alkylation of the two-dimensional sheet, and when water is used as an alkylation solvent for the alkylation, microbubbles having a spherical shape may be formed. In other words, when water is used as the alkylation solvent, the degree of alkylation of the two-dimensional sheet may be increased, and when the two-dimensional sheet having a high degree of alkylation and a hydrophobic solvent are used as an intermediate material and applied to a microfluidic system, a hydrophobic solvent may be isotropically removed during a step of removing the hydrophobic solvent, so as to provide a film having a uniform thickness on the microbubbles. Thereby, generally, the microbubbles may be controlled to have a spherical shape.

On the other hand, microbubbles having a non-spherical shape may be formed when the alkylation temperature is lowered, and the reaction time may be shortened. This is because the alkylation may be slowed by lowering the alkylation temperature and shortening the reaction time. Thereby, the two-dimensional sheet having a low degree of alkylation is formed. When employing the same as an intermediate material and applying it to the microfluidic system, gas accommodated in the microbubbles is dissolved while removing the hydrophobic solvent, and the size of the inner part of the microbubble is gradually decreased, so that the two-dimensional sheet having low dispersion stability in the hydrophobic solvent may exist in an aggregated form. This causes changes of an interfacial tension and characteristics that the two-dimensional sheet is assembled in the film, and finally, Laplace pressure difference occurs to generate deformation. Microbubbles having a non-spherical shape may be formed by such deformation. Although having the non-spherical shape by the deformation, the formed microbubbles have merits of very high uniformity (variation coefficient <5%) and high structural stability while having a film with a very thin thickness of about 10 nm to about 200 nm.

In a method of manufacturing the microbubbles according to an embodiment, as an intermediate material, an alkylated two-dimensional sheet, for example, graphene oxide having an alkylated surface functional group, is mixed with a hydrophobic solvent, as an external material, an aqueous solution is used as a solution having a different polarity from that of the hydrophobic solvent, and a gas is used as an internal material.

At this time, when the gas and the intermediate material are injected into the aqueous solution, bubbles are formed by the gas injection, but a composite bubble having a structure in which the bubble is surrounded with a liquid-phase film including an intermediate material is formed. In other words, the composite bubble is formed in a gas-in-oil-in-water (G/O/W) system of an aqueous solution (water, W), a liquid-phase film (oil, O) phase-separated by the hydrophobic solvent, and a gas (G) which is a substantial body of the bubble. Toluene may be used as the hydrophobic solvent, and the aqueous solution may be a solution including poly(vinyl alcohol) (PVA) as a surfactant.

After forming the composite bubble, by collecting the composite bubbles and selectively removing only the hydrophobic solvent from the liquid-phase film, only the solid film including the alkylated two-dimensional sheet remains, to finally form microbubbles.

By controlling a degree of alkylation in the alkylated two-dimensional sheet employed for the microfluidic system, the shape of microbubbles may be determined as explained above.

Meanwhile, the integrated structure according to an embodiment includes no surfactants, which is different from the conventional art. Specifically, the surfactant was necessarily used for manufacturing microbubbles in the conventional art, so there was no choice but to include the surfactant component in the finally obtained integrated structure. However, the integrated structure including the surfactant component, which is a solid bubble, collapses the shape after several hours, so it is difficult to say that the solid bubble is manufactured. According to an embodiment, an integrated structure in which the solid bubble is not collapsed after not only several hours but also several years may be obtained. Furthermore, the integrated structure has characteristics of ultra light-weight, high stiffness, and high elasticity, so may be utilized for various applications, and the utilization range is not limited.

Hereinafter, the present invention will be described in more detail with reference to specific preparation examples and structural analysis of the manufactured solid bubble and the results thereof.

Preparation Example 1: Manufacture of Solid Bubble (1) Synthesis of Alkylated Graphene Oxide-1

Graphene oxide showing a negative charge was synthesized according to a modified Hummer's method with graphite. Non-exfoliated graphene oxide was removed using a centrifuge, and exfoliated graphene oxide was dispersed in water as an alkylation solvent at a concentration of 2 mg/mL. For the alkylation, 2 g of EDC was added to 400 mL of the graphene oxide solution (0.5 mg/mL) to induce a reaction of the graphene oxide with a carboxyl group to prepare an intermediate material. Subsequently, 1 g of octadecylamine (ODA) was added, such that alkylated graphene oxide-1 was prepared through an amide bond. The reaction was continued at 70° C. for 3 days, and the reactant obtained after the alkylation reaction was washed using water and ethanol several times and dried in an oven at a temperature of 70° C.

(2) Manufacture of Solid Bubbles

A glass capillary microfluidic device in which co-flow and flow-focusing were combined was prepared as a microfluidic system. For the glass capillary microfluidic device, nitrogen gas was used as an internal material, a solution in which alkylated graphene oxide-1 was dispersed in a hydrophobic solvent of toluene was used as an intermediate material, and 2 wt % of a polyvinyl alcohol aqueous solution was used as an external material.

As shown in FIG. 2 (a), each of the internal material, the intermediate material, and the external material was injected into the microfluidic device using a syringe pump, and respective flowing speeds thereof were maintained at 5 psi, 3 mL/h, and 25 mL/h. Thereby, the G/O/W system composite bubbles were prepared (FIG. 2 (b)).

Subsequently, for the composite bubbles gathering on the air-water interface filled in a petri dish, toluene was evaporated and removed at room temperature to provide solid bubbles according to Preparation Example 1 of the present invention.

Preparation Example 2: Manufacture of Solid Bubbles

Alkylated graphene oxide-2 was prepared according to a method substantially equivalent to the synthesis method of alkylated graphene oxide-1, except that the temperature of the alkylation reaction was lowered from 70° C. to 40° C., and the reaction time was shortened from 3 days to 1 hour.

The alkylated graphene oxide-2 was prepared, and solid bubbles according to Preparation Example 2 were manufactured by a procedure substantially equivalent to that of Preparation Example 1.

Analysis of Alkylated Graphene Oxide and Results

In order to compare the alkylation degree of the alkylated graphene oxide-1 (H-ODA-GO) which was used for manufacturing the solid bubbles according to Preparation Example 1 to the alkylation degree of the alkylated graphene oxide-2 (L-ODA-GO) which was used for manufacturing the solid bubble according to Preparation Example 2, the graphene oxides (GO) themselves were prepared, and then whether each of them was alkylated or not was examined through Fourier transform infrared spectroscopy (FTIR). In addition, each of them underwent X-ray photoelectron spectroscopy (XPS) and X-ray diffraction analysis (XRD), and were also analyzed according to Raman spectroscopy. The results are shown in FIGS. 9 and 10.

Figure 9:
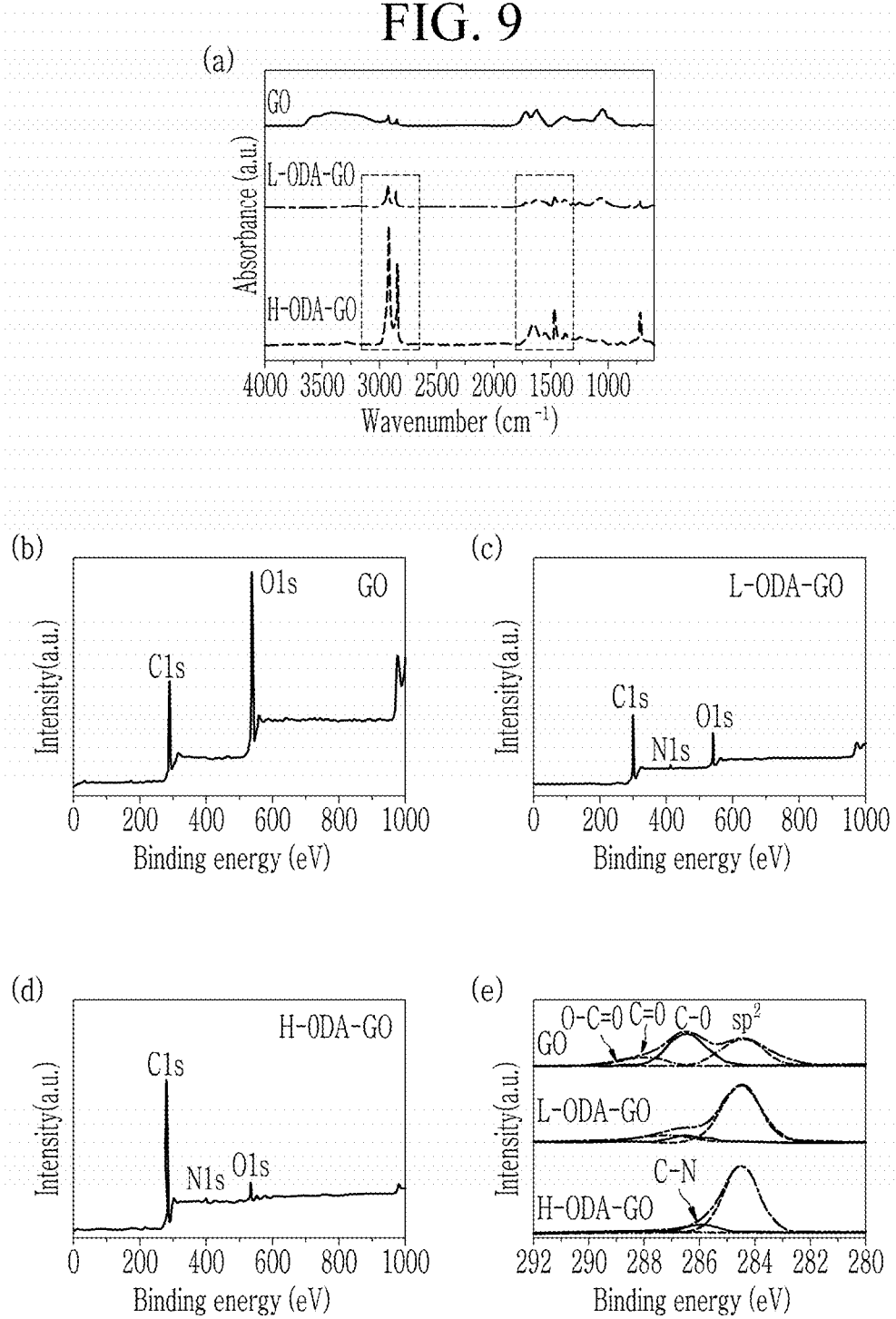
FIGS. 9 and 10 are graphs showing analysis results for confirming alkylation of each independently alkylated graphene oxide.
Figure 10:
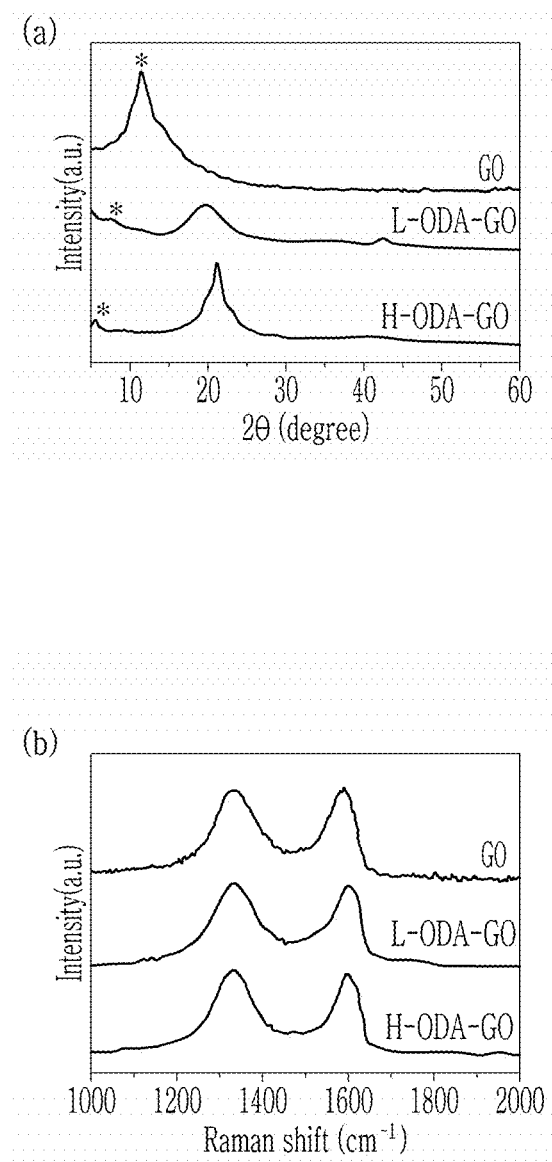

FIGS. 9 and 10 are graphs showing analysis results for confirming alkylation of each independently alkylated graphene oxide.

In FIG. 9, (a) is an FTIR graph of the alkylated graphene oxide-1 (H-ODA-GO), the alkylated graphene oxide-2 (L-ODA-GO), and the graphene oxide (GO); (b), (c), and (d) show XPS graphs of the alkylated graphene oxide-1 (H-ODA-GO), the alkylated graphene oxide-2 (L-ODA-GO), and the graphene oxide (GO); and (e) is a deconvoluted XPS graph with respect to each $C_1s$ orbital thereof.

Referring to FIG. 9 (a), C=O (1641-1645 $cm^{-1}$), N—H (1549 $cm^{-1}$), and C—N (1464-1468 $cm^{-1}$) binding peaks of the amide bond may be found in each of alkylated graphene oxide-1 and 2 (H-ODA-GO, L-ODA-GO), unlike the graphene oxide (GO). In addition, methylene and methyl stretching vibration peaks (2916-2920 $cm^{-1}$, 2850-2851 $cm^{-1}$, and 719-721 $cm^{-1}$) of the alkyl chain may be found in each of alkylated graphene oxide-1 and -2 (H-ODA-GO, L-ODA-GO). In other words, it may be confirmed that the alkylation occurred by the peaks. From the results that the peak intensity of the alkylated graphene oxide-1 (H-ODA-GO) was higher than that of the alkylated graphene oxide-2 (L-ODA-GO), it is posited that the degree of alkylation of the alkylated graphene oxide-1 (H-ODA-GO) is higher than the degree of alkylation of the alkylated graphene oxide-2 (L-ODA-GO).

Referring to FIGS. 9 (b), (c), and (d) together with (e), a presence of the nitrogen compound was confirmed through an XPS graph, and a C—N peak (286 eV) at the N1s peak and C1s peak was shown in (c) and (d), compared to (b), so it is confirmed that the alkylation reaction was performed by the amide bond. In addition, it is confirmed that the degree of alkylation was well controlled from the intensity comparison of C1s, O1s, and N1s peaks.

In FIG. 10, (a) is an XRD graph showing each of the alkylated graphene oxide-1 (H-ODA-GO), alkylated graphene oxide-2 (L-ODA-GO), and graphene oxide (GO), and (b) is a graph showing Raman spectroscopic results of each of them.

Referring to FIG. 10 (a), a distance between graphene oxide sheet layers may be estimated through the XRD graph. In a case of graphene oxide (GO), a strong peak was shown at 11.3°, thereby it is confirmed that the distance between layers (d-spacing) was about 0.781 nm. On the other hand, as alkylated graphene oxide-1 and -2 (H-ODA-GO, L-ODA-GO) peaks were shown at 5.56° and 7.2°, respectively, so it is understood that the distances between layers (d-spacings) were 1.23 nm and 1.59 nm, respectively. It is confirmed that the d-spacing was increased by a hydrophobic repulsive force caused by an alkylation chain of the graphene oxide sheet.

Referring to FIG. 10 (b), the positions and the shapes of D and G band peaks of the graphene oxide (GO) and alkylated graphene oxide-1 and -2 (H-ODA-GO, L-ODA-GO) were similar to each other. Thereby it is confirmed that the backbone structure was maintained as it was, and the chemical composition of the base surface of the graphene oxide was not influenced by the alkylation.

Structure Confirmation of Solid Bubble-1

For the solid bubbles according to Preparation Example 1 of the present invention, the composite bubbles formed while preparing the solid bubbles and the structure changes of the composite bubbles with the passage of the toluene removal time were captured in optical microscopic photographs. In addition, the solid bubbles according to Preparation Example 1 were captured in an electron microscopic photograph. The results are shown in FIG. 11.

Figure 11:
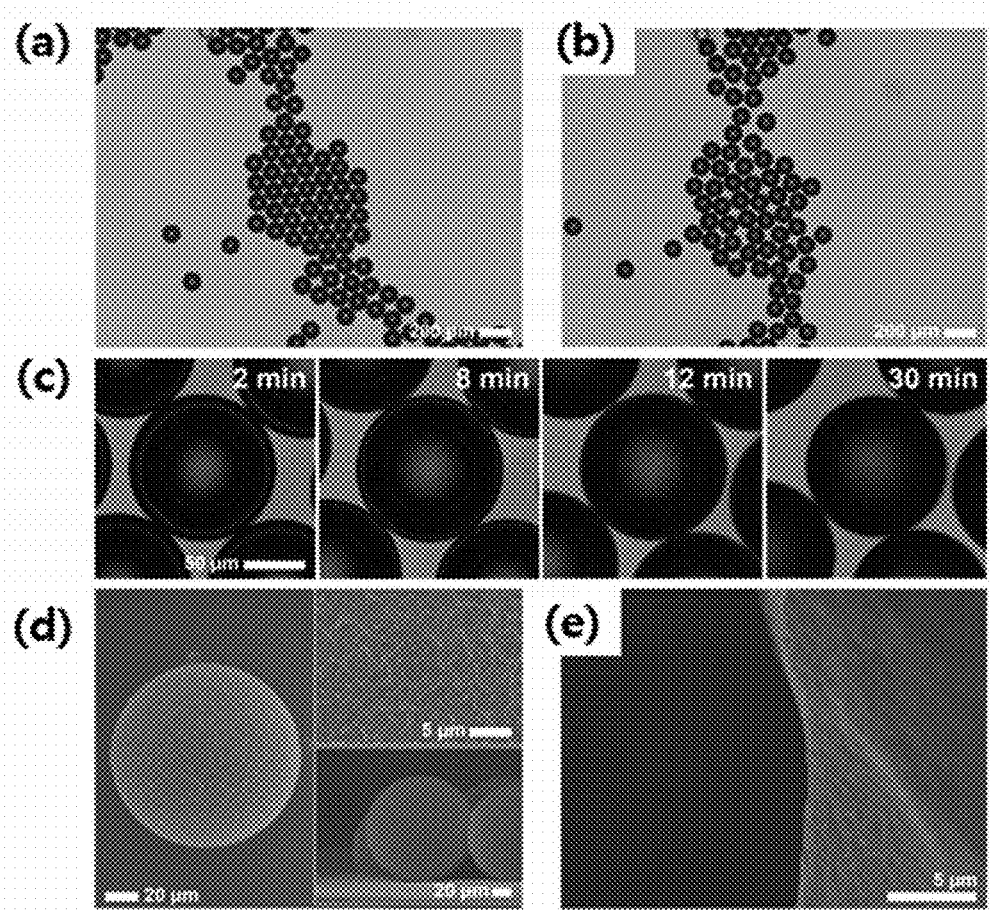
FIG. 11 shows optical microscope photographs and electron microscope photographs of solid bubbles manufactured according to Preparation Example 1 of the present invention.

FIG. 11 shows optical microscope photographs and electron microscope photographs of solid bubbles manufactured according to Preparation Example 1 of the present invention.

In FIG. 11, (a) is an optical microscope photograph of composite bubbles formed during the process for manufacturing solid bubbles according to Preparation Example 1; (b) is an optical microscope photograph of solid bubbles; (c) is optical microscope photographs showing structure changes in the composite bubbles of (a) with the passage of the toluene removal time; (d) is an electron micrograph of the solid bubbles according to Preparation Example 1; and (e) is an electron micrograph showing a thickness of the solid-bubble film shown in (d).

Referring to FIGS. 11 (a) and (b), it is confirmed that the composite bubbles and the solid bubbles all showed a three-dimensional structure having a spherical shape, and the formed sizes were all uniform.

As shown in FIG. 11 (c), as an intermediate material including toluene existed at an interface between the bubbles and an aqueous solution in an early stage of the toluene removal, a boundary line caused by a liquid film was found.

But according to passage of time, the boundary line disappeared by removing toluene.

In addition, referring to FIG. 11 (d), the shape was spherical, and a very thin film of a nano-size level was formed as shown in (e).

Structure Confirmation of Solid Bubble-2

For the solid bubbles according to Preparation Example 2 of the present invention, the composite bubbles and the structure changes of the composite bubble with the passage of the toluene removal time were captured in optical microscopic photographs. The results are shown in FIG. 12.

In addition, the solid bubbles (Preparation Examples 2A and 2B) having non-uniform film thicknesses were manufactured according to a process substantially equivalent to Preparation Example 2, but using graphene oxide having a different degree of alkylation. The structures of the obtained solid bubbles were photographed by an optical microscope. The results are shown in FIG. 12.

Figure 12:
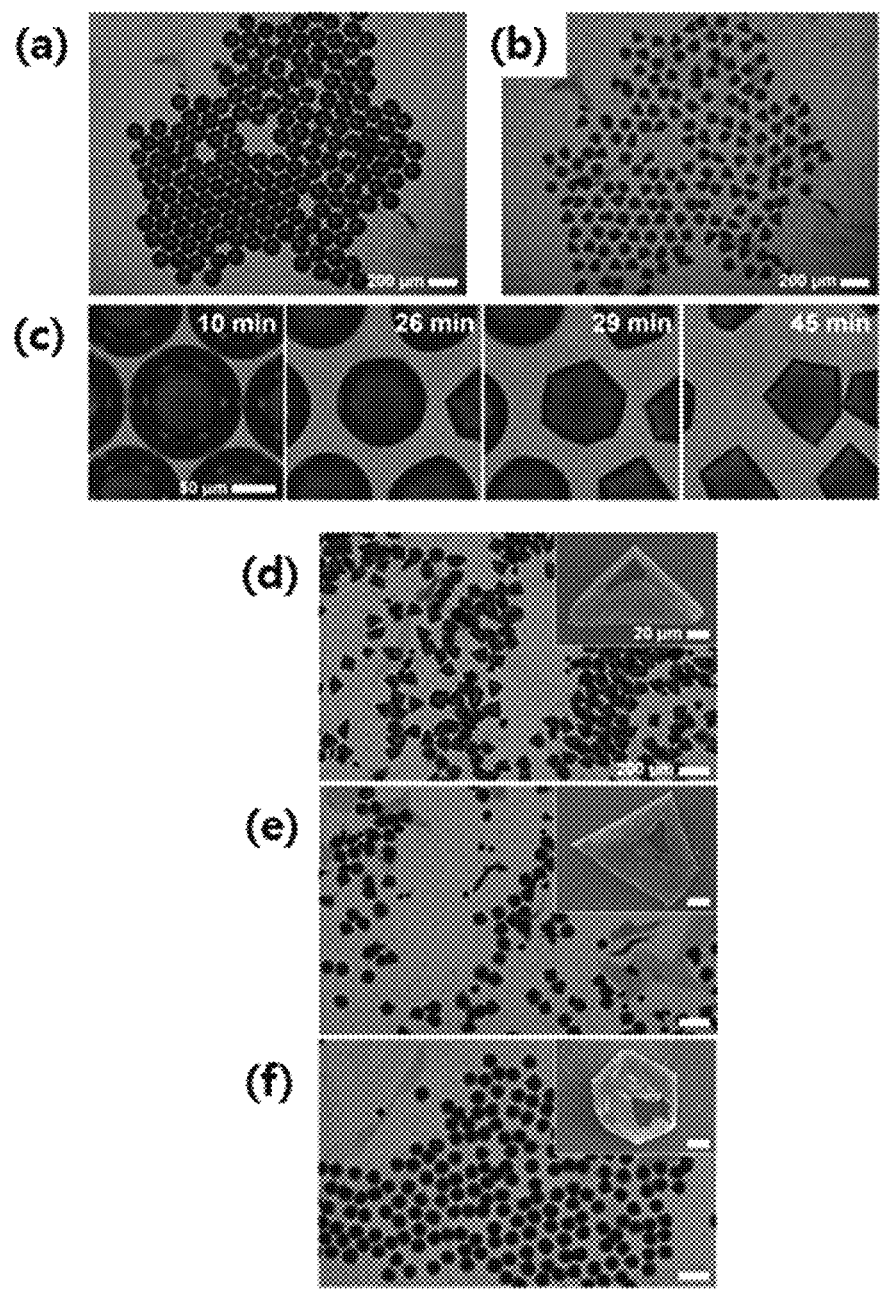
FIG. 12 shows optical microscope photographs of solid bubbles manufactured according to Preparation Example 2, Preparation Example 2A, and Preparation Example 2B of the present invention.

FIG. 12 shows optical microscope photographs of solid bubbles manufactured according to Preparation Example 2, Preparation Example 2A, and Preparation Example 2B.

In FIG. 12, (a) is an optical microscope photograph of composite bubbles formed during the process for manufacturing solid bubbles according to Preparation Example 2; (b) is an optical microscope photograph of solid bubbles; and (c) is optical microscope photographs showing that the structure of the composite bubbles of (a) was changed with the passage of the toluene removal time.

Referring to FIG. 12 (a) to (c), it is confirmed that the initially formed shape of the composite bubbles was shown to be spherical as shown in (a), but the shape was changed to non-spherical as shown in (c) according to removing the toluene, and the finally formed solid bubbles had the non-spherical shape as shown in (b).

In FIG. 12, (d) to (f) are each an optical microscopic photograph of solid bubbles having films with different thicknesses from each other ((d) is an optical microscopic photograph of the solid bubbles according to Preparation Example 2, (e) is an optical microscopic photograph of the solid bubbles according to Preparation Example 2A, and (f) is an optical microscopic photograph of the solid bubbles according to Preparation Example 2B). It is confirmed that the solid bubbles had non-spherical shapes which showed different morphologies from each other having different numbers of vertexes of the polyhedron cubic structure according to the different thicknesses of the film. In other words, it tends to show that the number of vertexes is increased as the film is thicker.

Preparation Example 3: Manufacture of Two-dimensional Solid-bubble Integrated Structure (Example 1)

Figure 6:
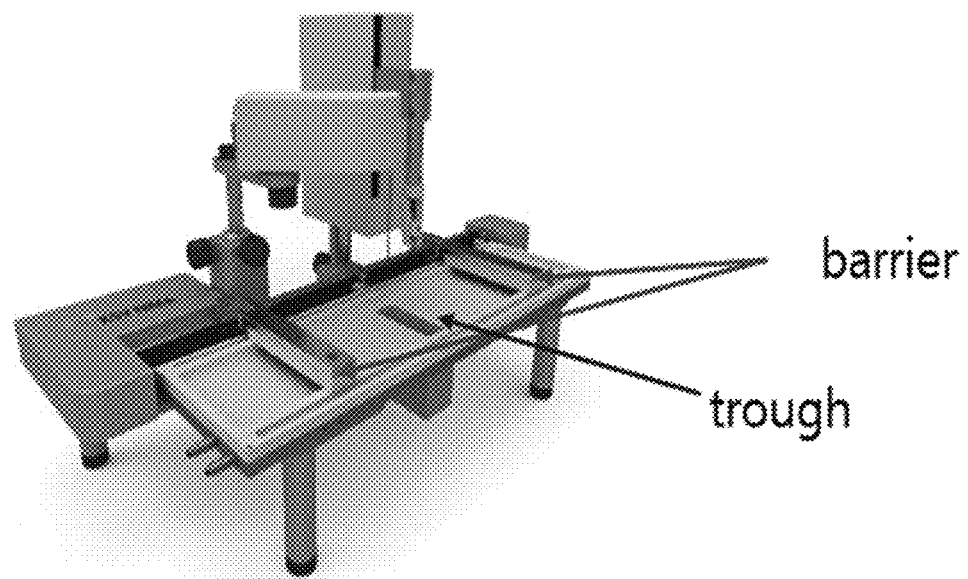
FIG. 6 is a diagram showing a Langmuir-Blodgett trough.

As the microbubbles have very low density, buoyancy moves them toward the upper part of the liquid surface, which may be utilized as a driving force for the two-dimensional arrangement. Thus, using a Langmuir-Blodgett trough (referring to FIG. 6) corresponding to the condition or a droplet on the hydrophobic substrate on which the liquid surface may be convexly formed as a means for manufacturing a two-dimensional integrated structure, and making an environment of a height difference of water levels (coexisting regions where the liquid phase is higher and where the liquid phase is lower), a two-dimensional integrated structure of microbubbles was fabricated.

Specifically, the solid microbubbles according to Preparation Example 1 obtained through a microfluidic system were obtained in a floating state on a surfactant aqueous solution constituting an outer phase, and the surfactant around the microbubbles was removed by repeatedly exchanging the solution with distilled water. Subsequently, a large amount of microbubbles were moved by pouring the same onto the trough or attaching the bubbles onto a different kind of substrate and detaching the same with distilled water. The two-dimensional arrangement of the microbubbles was induced by narrowing the barrier, then the barrier was moved to maintain a constant interface pressure, and simultaneously, the substrate for the second-dimensional integrated structure was lifted from under the water surface to above it, so as to provide a two-dimensional hexagonal system integrated structure. (Alternatively, after inducing the two-dimensional arrangement of the microbubbles by narrowing the barrier, a two-dimensional integrated structure may be formed according to a Langmuir Schaefer moving method in which the substrate approaches parallel to the water surface on the two-dimensionally assembled microbubbles). Subsequently, the defects of the unit body (graphene oxide) for the two-dimensional hexagonal integrated structure were recovered through chemical reduction (e.g. hydrazine vapor, 100° C., 12 hours) or thermal reduction (e.g. argon:hydrogen=3:1 (v/v), 700° C. to 800° C., 1 hour) to provide a super-integrated structure having a honeycomb structure.

Preparation Example 4: Manufacture of Two-Dimensional Solid-Bubble Integrated Structure (Example 2)

As in Preparation Example 3, the surfactant surrounding the microbubbles was removed by repeatedly performing the solution exchange with distilled water for the microbubbles according to Preparation Example 1 which were floating on the surfactant solution. Subsequently, the washed microbubbles were transferred by attaching and detaching the same using the different kind of substrate under the environment of having a height difference of liquid levels (droplets stacked on the hydrophobic substrate). Further, as the microbubbles had very low density, buoyancy moved them toward a central region which is the highest region in the droplets, inducing self-assembly. In order to obtain a high degree of crystallinity, the liquid surface where the microbubbles were assembled was applied with vibration or pneumatic pressure from the outside to increase crystallinity of the two-dimensional integrated structure. Microbubbles were assembled in a two-dimensional hexagonal system on the liquid surface, and then the liquid phase was dried to provide microbubbles (two-dimensional hexagonal integrated structure) assembled in the two-dimensional hexagonal system on the substrate. Then defects of the unit body (graphene oxide) for the two-dimensional hexagonal integrated structure were recovered through chemical reduction (e.g. hydrazine vapor, 100° C., 12 hours) or thermal reduction (e.g. argon:hydrogen=3:1(v/v), 700° C. to 800° C., 1 hour) to provide a super-integrated structure having a honeycomb structure.

Preparation Example 5: Manufacture of Three-Dimensional Solid-Bubble Integrated Structure (Example 3)

In order to remove the surfactant solution floating the microbubbles (diameter: 100 microns) according to Preparation Example 2 and to selectively obtain an integrated structure of microbubbles, it used a micro metal mesh with gaps (45 micron) that were smaller than a diameter of the microbubbles. A three-dimensional frame was manufactured by processing the micro metal mesh into a shape that was opened only toward the upper side from the three-dimensional structure to be obtained (e.g., the mesh may be formed in a cup shape opened at the upper side in order to provide a cylindrical integrated structure), and then the microbubbles were filtered, and a sufficient amount of bubbles were assembled into the processed three-dimensional frame. In order to enhance a degree of the three-dimensional arrangement of the microbubbles, the frame on which the microbubbles were filtered was turned over, and then distilled water was slowly filtered therethrough in a direction from the bottom of the frame to the opened upper side thereof, considering that the microbubbles are lighter than water. During the filtering process, the microbubbles were lifted upward more than water by buoyancy, so a three-dimensional integrated structure (cubic) was formed in a high degree of arrangement from the bottom of the frame. Subsequently, the three-dimensional integrated structure (cubic) was dried in a desiccator to remove remaining moisture. By recovering defects of the unit body (graphene oxide) for the three-dimensional cubic integrated structure (cubic) by performing chemical reduction (e.g. hydrazine vapor, 100° C., 12 hours) or thermal reduction (e.g. argon:hydrogen=3:1(v/v), 700° C. to 800° C., 1 hour), a super-integrated structure having a unit structure of a rhombic dodecahedron was manufactured.

Structure Confirmation of Two-Dimensional and Three-Dimensional Solid-Bubble Integrated Structure Various microscope and FFT analyses were performed to confirm structures of the solid-bubble structures according to Example 1 and Example 3 of the present invention, and the results are shown in FIGS. 2 to 5.

FIGS. 2 to 5 are views showing analysis results of the microbubbles and the integrated structure of the present invention.

Specifically, FIG. 2 (a) shows that G/O/W composite bubbles were formed using a glass capillary microfluidic device. In this case, nitrogen gas was used as an internal material of the microbubbles, a toluene solution in which alkylated graphene oxide was dispersed was used as an intermediate material, and an aqueous solution including a surfactant of poly(vinyl alcohol) was used as an external material. FIG. 2 (b) shows an optical microscopic image of the G/O/W composite bubbles formed by the glass capillary microfluidic device, and FIG. 2 (c) schematically shows a structure of the formed microbubbles.

Figure 3:
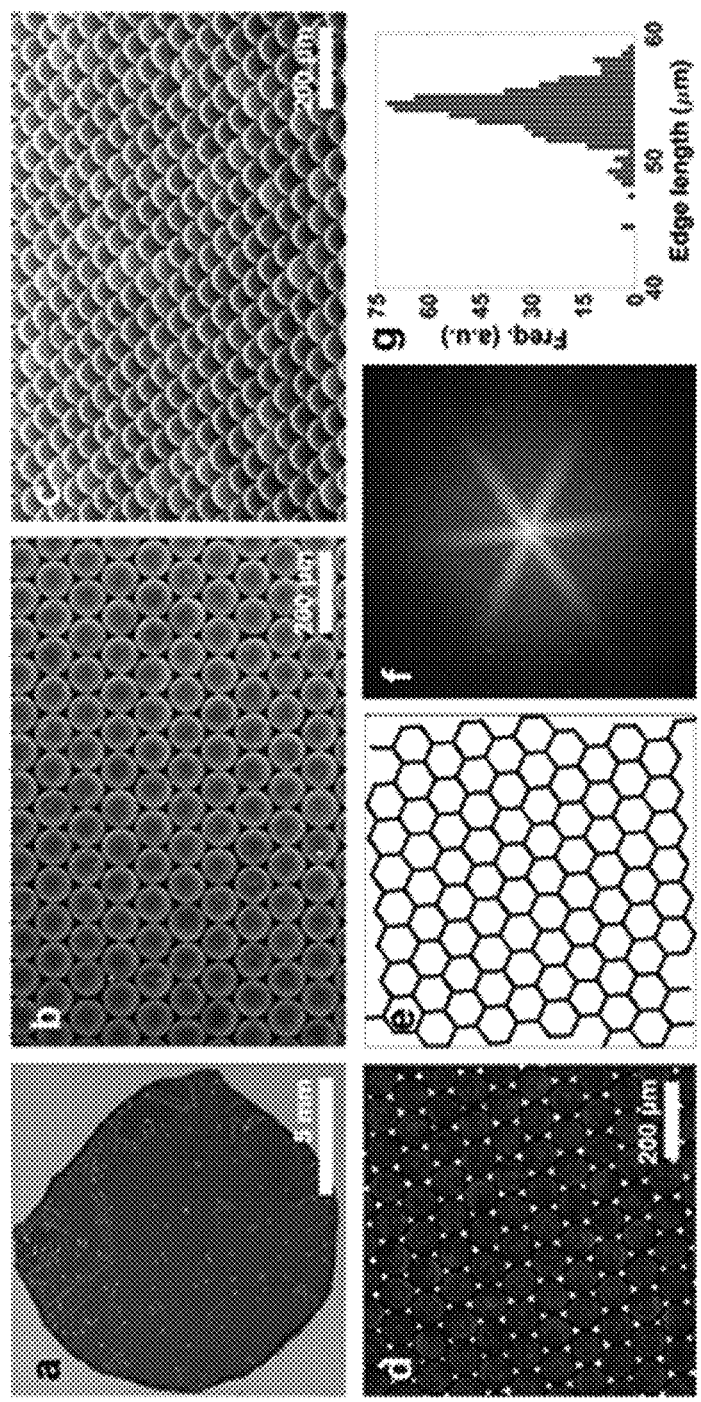

FIG. 3 (a) shows that the graphene oxide microbubbles formed a structure having a two-dimensional hexagonal system arrangement, and FIGS. 3 (b) and (c) show electron microscopic images thereof. FIG. 3 (d) shows an optical microscope image used for Voronoi tessellation, FIG. 3 (e) shows the Voronoi tessellation results of the two-dimensional hexagonal arrangement, FIG. 3 (f) shows regularity of the structure through FFT conversion for the Voronoi tessellation results, and FIG. 3 (g) shows that the arrangement structure was very uniform by an edge length distribution of the Voronoi tessellation results. As shown in FIG. 3, it is confirmed that the two-dimensional hexagonal integrated structure according to Example 1 had very high uniformity.

Figure 4:
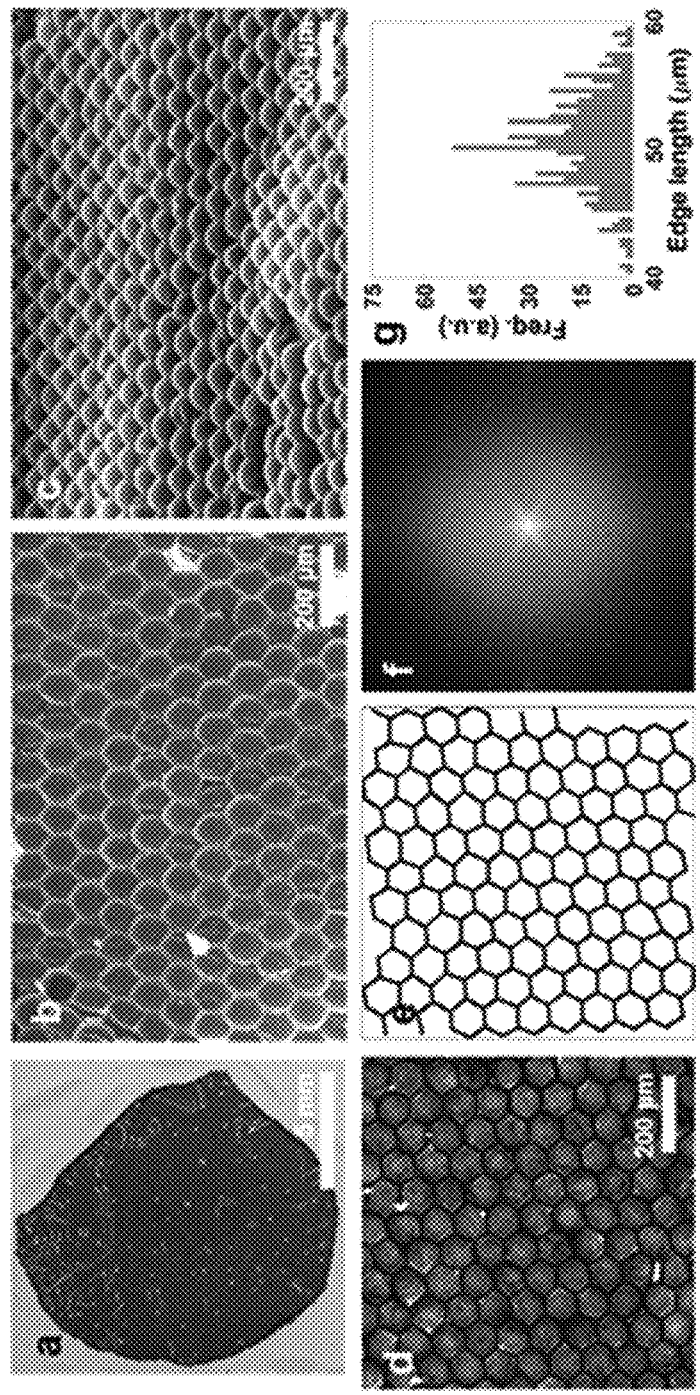

FIG. 4 (a) is an image showing that a structure having a two-dimensional honeycomb arrangement of graphene oxide microbubbles was formed using the structure having the two-dimensional hexagonal system arrangement shown in FIG. 3, and FIGS. 4 (b) and (c) show optical microscope images thereof. FIG. 4 (d) shows an optical microscope image used for Voronoi tessellation, FIG. 4 (e) shows the Voronoi tessellation results of the two-dimensional honeycomb structure arrangement, FIG. 4 (f) shows regularity of the structure through FFT conversion for the Voronoi tessellation results, and FIG. 4 (g) shows an edge length distribution of the Voronoi tessellation results and shows that the uniformity was lower than the hexagonal system structure shown in FIG. 3, but the arrangement structure was well maintained with uniformity after the deformation. As shown in FIG. 4, the super-integrated structure of the honeycomb structure in which the two-dimensional hexagonal integrated structure according to Example 1 was reduced had a closed cell structure having very high uniformity, so it is confirmed that the utilization value thereof is very high.

Figure 5:
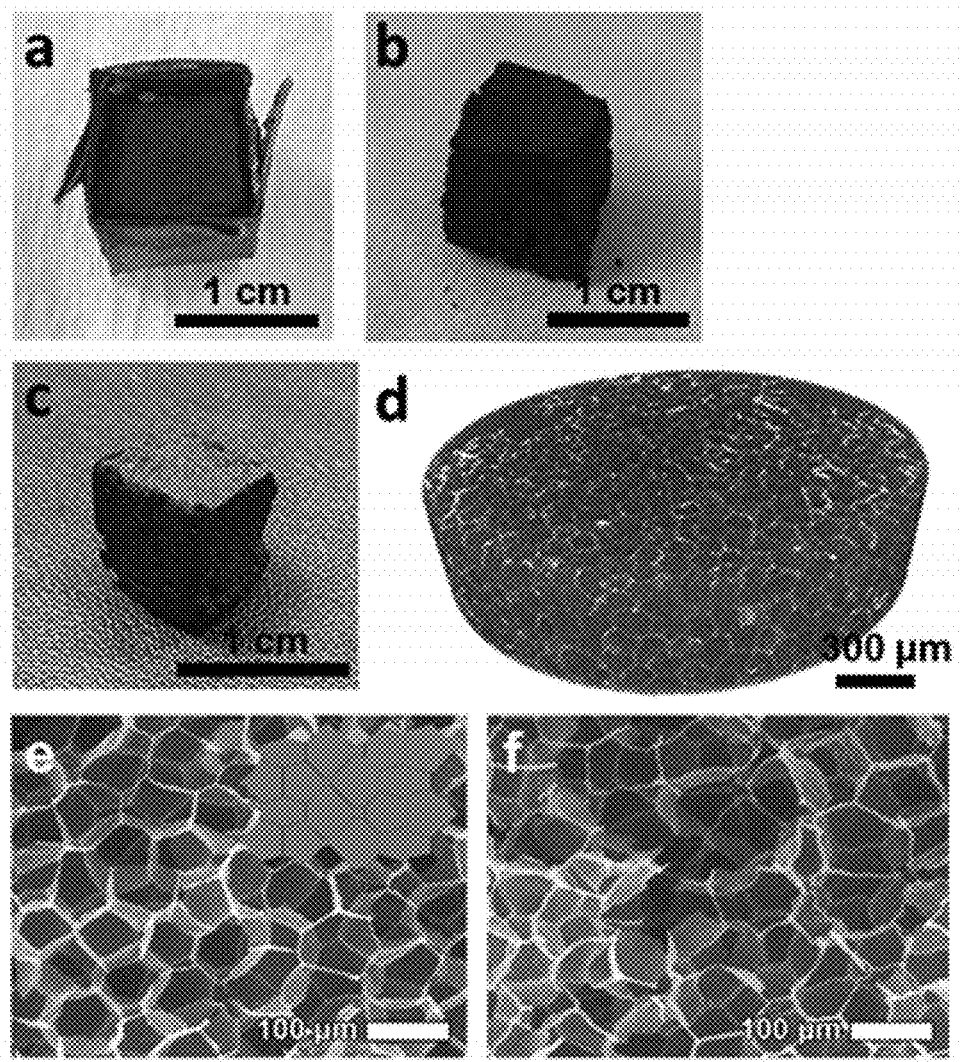
Figure 13:
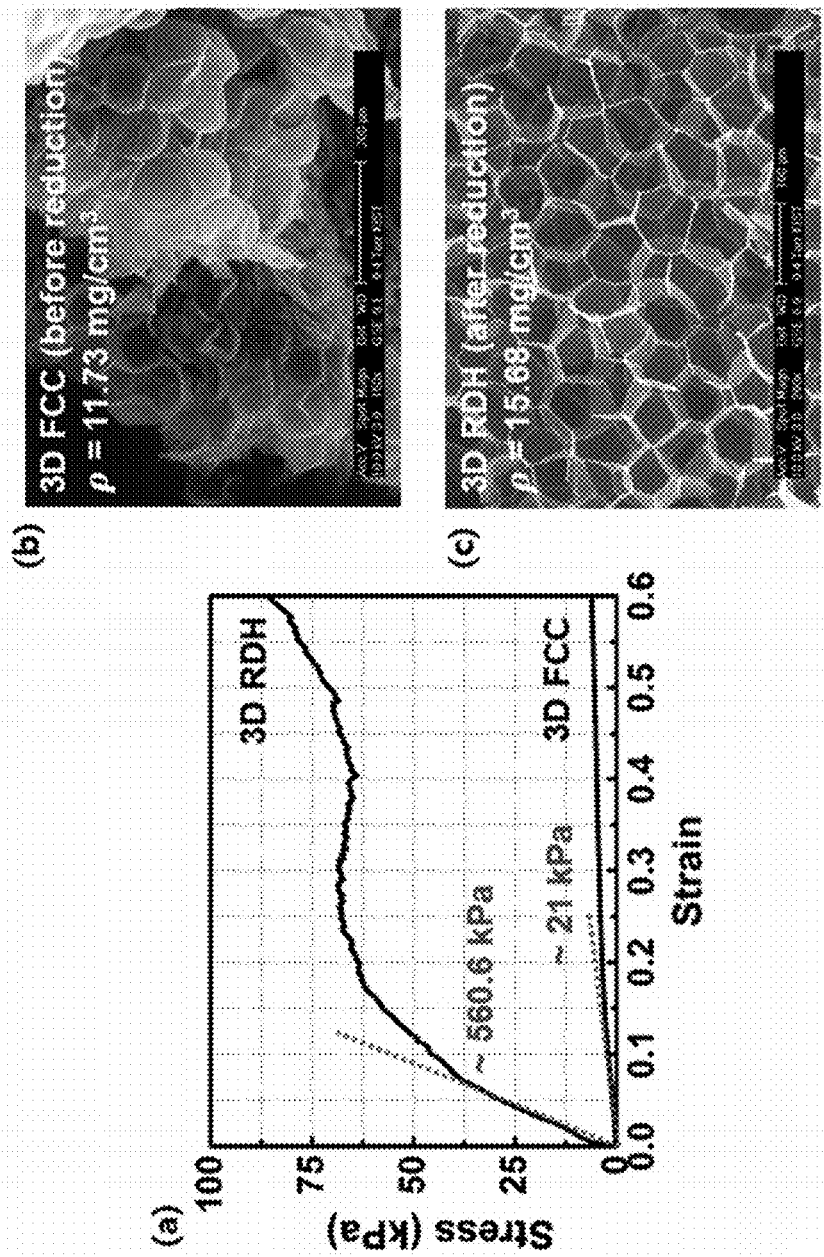
FIG. 13 shows a graph of a compressive modulus and scanning electron microscope (SEM) photographs of each solid bubble before reduction (or heat treatment) and after reduction (or heat treatment) of the present invention.

FIG. 5 (a) shows a three-dimensionally assembled graphene oxide microbubble structure in a stainless steel 325 mesh frame, (b) shows an ultra-light (10 mg/cm$^3$) structure in which the stainless steel mesh was removed, and (c) shows a three-dimensional arrangement structure in which the same was reduced. FIG. 5 (d) shows the inner structure of the reduced three-dimensional arrangement structure monitored by 3D tomography of Pohang Accelerator Laboratory, and FIG. 5 (e) shows an image that is enlarged and analyzed by an electronic microscope and a similarity with a cross-sectional surface of a rhombic dodecahedron which is a theoretically arrangement form. FIG. 5 (f) shows a cross-sectional surface after performing a compressive modulus analysis (strain=0.6), and it is confirmed to conserve the same structure as in FIG. 5 (e) which is before performing the compression. FIG. 13 (a) shows a compressive modulus analysis (about 560 kPa) graph of the reduced three-dimensional arrangement structure. As shown in FIG. 5, the three-dimensional cubic integrated structure according to Example 3 had very high uniformity, and the rhombic dodecahedral honeycomb structure obtained by reducing the same had a closed cell structure having very high uniformity, so it is confirmed that it has a very high utilization value as an ultra-light and super-stiff integrated structure. (As shown in FIG. 13 (a), it is confirmed that the compressive modulus analysis results of the non-reduced three-dimensional cubic integrated structure showed about 21 kPa, so the mechanical properties were remarkably improved through the reduction process.)

(Also from FIGS. 13 (b) and (c), by performing the reduction process, the contact region between bubbles was changed from point contact to area contact having no voids according to fluidizing the microbubble film, so as to provide a continuous closed cell structure. Thereby, it is confirmed that the three-dimensional cubic arrangement structure was converted to a super-integrated structure having a rhombic dodecahedron honeycomb structure.)

Figure 14:
FIGS. 14 to 16 are photographs showing an elasticity of the integrated structure manufactured according to Preparation Example 5, respectively.
Figure 15:
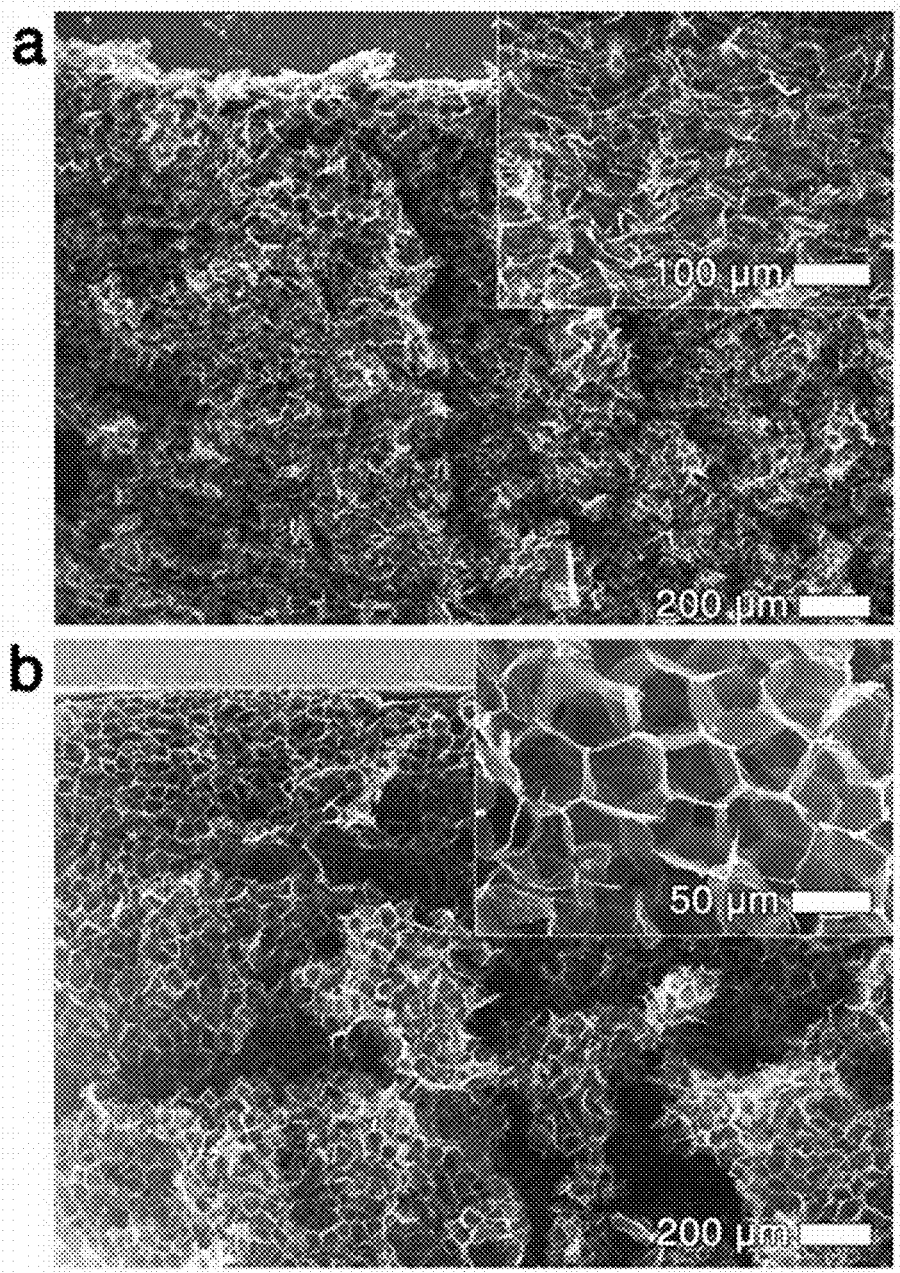

Confirmation of Elasticity of Three-Dimensional Solid-Bubble Integrated Structure Elasticity of the solid-bubble structure according to Example 3 was measured using a UTM (universal testing machine), and the results are shown in FIGS. 14 to 16. FIG. 14 is a photograph of applying compression stress to the solid-bubble structure, FIG. 15 (a) is an enlarged image of the solid-bubble structure directly after applying 80% compression stress, and FIG. 15 (b) is a photograph showing that the solid-bubble structure was completely recovered after applying the 80% compression stress. FIG. 16 shows photographs of each solid bubble structure before applying the compression stress, directly after fully applying 87% compression stress, and after applying the 87% compression stress. From FIGS. 14 to 16, it may be confirmed that the solid-bubble structure of Example 3 had excellent elastic restoring force and high elasticity.

The above descriptions have been made with reference to preferred embodiments of the present invention, but it will be apparent to those skilled in the art that various modifications and variations may be made in the present invention without departing from the spirit and scope of the invention as defined in the appended claims.

DESCRIPTION OF SYMBOLS

1 gas (air automatic suction point)
2 spherical body
3 small holes
4 microbubble
5 liquid flow

What is claimed is:

1. A method of manufacturing an integrated structure, comprising:
    forming microbubbles;
    processing micromesh into a three-dimensional frame, the micromesh having gaps that are smaller than diameters of the microbubbles; and
    assembling the microbubbles inside the three-dimensional frame by integrating the microbubbles into the three-dimensional frame to provide the integrated structure.

2. The method of claim 1, wherein the forming of the microbubbles comprises a process in which a gas phase is injected into a liquid phase using a fine single/multichannel or porous multi-channel (membrane) including a microfluidic system.

3. The method of claim 1, further comprising performing a reduction process, or a heat treatment process at about 70° C. or higher, after the assembling of the microbubbles.

4. The method of claim 3, wherein the heat treatment process at about 70° C. or higher is a thermal reduction in a temperature condition of about 300° C. to about 1000° C. for about 30 minutes to about 2 hours under a mixed gas atmosphere.

5. The method of claim 4, wherein the mixed gas atmosphere comprises argon gas and hydrogen gas in a volume ratio of about 1:1 to about 5:1.

6. The method of claim 3, wherein the reduction process is a chemical reduction in a temperature condition of about 70° C. to about 150° C. for about 1 hour to about 24 hours using a reducing agent.

7. The method of claim 6, wherein the chemical reduction comprises hydrazine gas.

8. The method of claim 1, wherein the microbubbles are formed by alkylating a graphene-based two-dimensional material, a chalcogen compound-based two-dimensional material, or an MXene-based two-dimensional material.

9. An integrated structure manufactured by the method of claim 1, and
    having a three-dimensional structure.

10. The integrated structure of claim 9, wherein the integrated structure is an integrated structure of the microbubbles.

11. The integrated structure of claim 10, wherein the microbubbles are the same size.

12. The integrated structure of claim 10, wherein the microbubbles have different sizes.

13. The integrated structure of claim 9, wherein the three-dimensional structure is a cubic structure.

14. An integrated structure manufactured by the method of claim 3, and having a three-dimensional structure.

15. The integrated structure of claim 14, wherein the integrated structure is a super-integrated structure in which the microbubbles are integrated to have a continuous structure without a void.

16. The integrated structure of claim 15, wherein the microbubbles are the same size.

17. The integrated structure of claim 15, wherein the microbubbles have different sizes.

18. The integrated structure of claim 14, wherein a unit structure of the three-dimensional structure is a rhombic dodecahedral honeycomb structure.

\* \* \* \* \*